US010346736B2

(12) United States Patent
Hunte

(10) Patent No.: US 10,346,736 B2
(45) Date of Patent: Jul. 9, 2019

(54) SYSTEMS AND METHODS FOR ADAPTIVE NON-LINEAR CONTROL OF PROCESS SYSTEMS

(71) Applicant: Kyle Hunte, Brooklyn, NY (US)

(72) Inventor: Kyle Hunte, Brooklyn, NY (US)

( * ) Notice: Subject to any disclaimer, the term of this patent is extended or adjusted under 35 U.S.C. 154(b) by 294 days.

(21) Appl. No.: 15/228,264

(22) Filed: Aug. 4, 2016

(65) Prior Publication Data
US 2017/0045867 A1 Feb. 16, 2017

Related U.S. Application Data

(60) Provisional application No. 62/203,459, filed on Aug. 11, 2015.

(51) Int. Cl.
| | |
|---|---|
| *G05B 19/042* | (2006.01) |
| *G06N 3/02* | (2006.01) |
| *G06N 7/08* | (2006.01) |
| *G05B 13/02* | (2006.01) |

(52) U.S. Cl.
CPC .............. *G06N 3/02* (2013.01); *G06N 7/08* (2013.01); *G05B 13/02* (2013.01); *G05B 2219/23288* (2013.01); *G05B 2219/23425* (2013.01); *G05B 2219/25255* (2013.01)

(58) Field of Classification Search
CPC .......... G05B 13/02; G05B 2219/23288; G05B 2219/23425; G05B 2219/25255; G06N 3/02; G06N 7/08
See application file for complete search history.

(56) References Cited

U.S. PATENT DOCUMENTS

| | | | | |
|---|---|---|---|---|
| 7,809,668 | B1* | 10/2010 | Smith | G05B 13/0275 |
| | | | | 700/42 |
| 9,240,721 | B2* | 1/2016 | Babazadeh | H02M 3/1584 |
| 9,690,312 | B2* | 6/2017 | Steven | G06Q 50/06 |
| 2006/0100721 | A1* | 5/2006 | Piche | G05B 5/01 |
| | | | | 700/47 |
| 2011/0270452 | A1* | 11/2011 | Lu | G05B 19/042 |
| | | | | 700/291 |
| 2014/0015500 | A1* | 1/2014 | Babazadeh | H02M 3/1584 |
| | | | | 323/272 |
| 2016/0161925 | A1* | 6/2016 | Chang | G05B 11/42 |
| | | | | 700/37 |

* cited by examiner

*Primary Examiner* — Abdelmoniem I Elamin
(74) *Attorney, Agent, or Firm* — Leason Ellis LLP

(57) ABSTRACT

The invention provides systems and methods for generating an adaptive nonlinear controller and utilizing the adaptive nonlinear controller to regulate the operation of nonlinear process systems. In particular, a method is provided for generating a control model by defining an objective function utilizing a target function that specifies the desired response of the system and a state-space model representing the dynamics of the non-linear system. When executed by a controller the control model causes the regulated system to operate as specified by the target function and thereby produce a product that is consistent with various prescribed quality metrics.

15 Claims, 34 Drawing Sheets

SYSTEMS AND METHODS FOR ADAPTIVE NON-LINEAR CONTROL OF PROCESS SYSTEMS

CROSS REFERENCE TO RELATED APPLICATION

This application claims the benefit of U.S. provisional application Ser. No. 62/203,459, filed Aug. 11, 2015, which is hereby incorporated by reference in its entirety.

TECHNICAL FIELD OF THE INVENTION

The present invention relates to process control systems, in particular, systems and methods for adaptive non-linear control of process systems.

BACKGROUND OF THE INVENTION

1 Introduction

The controller design presented is intended for the use in the field of process control. Normally in this field it is quite common for there to be found controllers based on the Proportionate Integral Derivative (PID) control method. PID control systems are generally used to control a nonlinear system around a predetermined operating point. In a properly designed PID control system, the design begins with the linearization of the nonlinear system around the operating point. The linearization is then followed by the preliminary selection of the respective gains $K_p$, $K_i$ and $K_d$ which are the proportionate, integral and derivative gains respectively based. During implementation, the control engineer is required to tune the values of these gains to acquire the desired closed loop response by viewing the trends of the process variable. Overtime the control engineer will be required to re-adjust the gains as the parameters of the system which were obtained from linearization have drifted away from the original values due to either the nonlinear nature of the process or a change in components of the process.

In most cases the drifting of parameters is the cause of changes in the response of the controller and therefore by extension a change in the quality of the product. For batch processes, maintaining consistency between batches is a requirement as there needs to be a small variation between batches of a given product. For a continuous process, this may result in more of the material produced having to be recycled back through the plant to obtain the required grade as in distillation systems. In addition to these concerns, the drifting of parameters can result in the system becoming unstable as the linearized close loop poles would have shifted to an unstable region. It is therefore the intention that the adaptive nonlinear control algorithm that is proposed address the issues that have been highlighted and provide the following features for nonlinear systems.

The features of the adaptive nonlinear control algorithm are:
1. Stability of the control system within the desired operating region.
2. A method to provide the system with the desired closed loop response.
3. Tracking of an input reference system.

To demonstrate the useful nature of the control system with reference to the features described above, linear and nonlinear systems will be presented. The inclusion of the linear systems are to further illustrate the benefits and aid in the understanding of the control algorithm.

2 Background

As it was introduced in the previous section, practically all of the systems used in the process industry are nonlinear. Generally speaking all real systems exhibit some form of nonlinear behavior. Typical characteristics of a nonlinear system are the coupling of the state variables with each other or the coupling of the state variables with the control input. The aim of the invention is to provide an adaptive nonlinear controller capable of regulating the output of a nonlinear system. The obvious problem with the control of a nonlinear system is due to their nonlinearities. These nonlinearities can be attributed to the list of characteristics that are presented below with explanations. The invention provides a method to developing an adaptive nonlinear controller that can be applied to nonlinear systems in the presence of these problems.

I. Time-Varying Characteristics.

These characteristics relate to systems which are time variant and can be expressed in the simplest form in the equations below where $A(t)$ is the time varying state matrix, $x(t)$ is the state vector, $B(t)$ is the input matrix, $u(t)$ is the system input, $y(t)$ is the output vector and $C(t)$ is the output state matrix.

$$\dot{x}(t)=A(t)x(t)+B(t)u(t)$$

$$y(t)=C(t)x(t)$$

II. Nonlinear Behavior

The nonlinear behavior of a system can be generated from the coupling of system inputs with the system states and also the inclusion of nonlinear functions within the state equations where x is the system state, u the system input, y the system output, $f(x,u)$ a nonlinear vector of the system state and its input and $h(x)$ is a nonlinear vector of the system state.

$$\dot{x}=f(x,u)$$

$$y=h(x)$$

III. Model Inaccuracies

Model inaccuracies can arise from areas such as linearization and the assumptions made on the system parameters. Linearization of a nonlinear system can result in the system becoming ill-conditioned. For example using the system given above, the dynamics of a nonlinear system is linearized using the method shown in below to compute the linearized state equations.

$$\tilde{A} = \begin{bmatrix} \frac{\partial f_1(x,u)}{\partial x_1} & \cdots & \frac{\partial f_1(x,u)}{\partial x_n} \\ \vdots & \ddots & \vdots \\ \frac{\partial f_n(x,u)}{\partial x_1} & \cdots & \frac{\partial f_n(x,u)}{\partial x_n} \end{bmatrix}$$

$$\tilde{B} = \begin{bmatrix} \frac{\partial f_n(x,u)}{\partial u_1} & \cdots & \frac{\partial f_1(x,u)}{\partial u_p} \\ \vdots & \ddots & \vdots \\ \frac{\partial f_n(x,u)}{\partial u_1} & \cdots & \frac{\partial f_n(x,u)}{\partial u_p} \end{bmatrix}$$

The linearized dynamics of the nonlinear system are therefore $$\partial \dot{x} = \tilde{A}\delta x + \tilde{B}\delta u.$$

IV. Sensory feedback

The measurement of the output it important in feedback systems. In some cases all of the system states to be used in the controller are not available due to either the cost of equipment or a feasible method of measurement is not available. There is also the issue of the measurements being provided at the input of the controller after some time delay.

3 Limitations of Present Solutions

There are several limitations to the current control methods used to regulate nonlinear systems. The most common method is the application of linearization to the nonlinear system. The issue with linearization is that it restricts the control system developed to only being effective when all the system states are within a small region around the specified operating point. If the nonlinear system exits this region, the controller is no longer useful. One solution to this problem comes in the form of sliding mode control which links a series of local PID controllers at various regions of the systems operation. The problem with this solution is that there exist "chattering" when the system switches from one local controller to another local controller. This can cause oscillations within the system as the change in control action can send the system into a region where another controller has been specified and the action of the new controller returns the system to the other control region.

Model Predictive Control (MPC) is another method which can be used to control nonlinear systems. This control method is also based on the on initial development of a linearized model of the nonlinear system. Despite the known benefits of MPC, it is susceptible to an ill conditioned model. An Ill conditioned model occurs when there is a small variation of the linearized process parameters which cause the system poles of the linearized model to vary greatly.

PID controllers can be implemented and they assume that parameters of the linearized system are constant. Therefore for nonlinear systems, the response of the controller can vary and affect the performance of the closed loop system. Using a chemical process such as the distillation column as an example, the reduced effect of the control system can be explained. One of the purpose of control in a binary distillation column is to regulate the quality of the composition of the product streams exiting the column. Over time the parameters vary due to changes in the characteristics of the pumps and the internal flows within the column. PID controllers are developed using some knowledge of the system to place the system at specific operating points. Therefore changes in the parameters over time cause the poles to be shifted to regions which may be undesirable. If we consider the shifting of the closed loop system poles, the system response may acquire larger oscillations and take a longer time to settle to the reference values.

Another solution to the control of nonlinear systems is feedback linearization. This control strategy removes the nonlinearities of the system through feedback given that the nonlinearities are all located within the same state equation as the control input. If there are any nonlinearities within other state equations, transformation of the system to a controllable form is therefore required. To successfully apply this technique all the parameters of the system must be known. An additional drawback of this type of control is that it cannot be applied to systems where the coefficient of the control input approaches zero and therefore causes a singularity at the control input.

It should be understood that there do exist control strategies which are capable of controlling nonlinear processes as shown in the referenced documents. However, they lack certain characteristic features of the algorithm which is being proposed. What is needed are non-linear control systems and methods that address the foregoing problems.

The invention provides systems and methods for generating an adaptive nonlinear controller and for applying the adaptive nonlinear controller to regulating nonlinear process systems in the presence of the foregoing problems in a manner that minimizes the foregoing problems. The next section will illustrate the features of the adaptive non-linear control algorithm which make it unique and demonstrate its development and implementation.

SUMMARY OF THE INVENTION

According to an aspect of the present invention, there is provided a method for configuring a controller of a non-linear process system for producing a product. The method includes the step of providing a state-space model of the system. The state space model comprises one or more state-space equations representing a relationship between at least one system variable x, and at least one system output y that relates to a quality measure of the product. In addition the state space model is a function of at least one control variable u that is an input to the system. The method also includes the step of transforming the state-space model into one or more controllable canonical equations, wherein at least one of the one or more controllable canonical equations includes the control variable u. The transforming is performed with one or more processors configured by executing instructions in the form of code therein.

The method also includes the step of generating, with the one or more processors, an objective function J. Generating the objective function includes the step of selecting, with the one or more processors, the objective function J from among a plurality of objective functions stored in a non-transitory computer readable storage medium. J is selected based on at least an order of the state space model. In addition, J is a function of the system output y, the derivatives of y and a control input v, a gain $\lambda$ and system constants a and b. In particular, control input v defines one or more operational set-points of the system. Generating the objection function also includes the step of inputting, with one or more processors, the one or more controllable canonical equations into the selected objective function.

The method also includes the step of minimizing, with one or more processors, the objective function with respect to the control variable u. The method also includes the step of selecting, with one or more processors, parameters of the control system including the gain $\lambda$ and a and b according to constraints of the non-linear process system. Lastly, the method includes the step of programmatically configuring the controller to implement a control algorithm defined by the minimized objective function in view of the selected parameters.

According to another aspect of the present invention, there is provided a method for regulating a non-linear process system for producing a product. The method includes the step of providing, to a computer-based controller, a state-space model of the non-linear process system ("the system"). The state-space model represents a relationship between at least one system variable and at least one system output, which relates to a quality measure of the product produced by the system, as a function of at least one system control variable. In particular, the at least one system control variable is an input to the process system and is controlled by the controller. The method also includes the step of providing, to the controller, a reference model, wherein the reference model defines a target response of the at least one system output in relation to at least one controller input to produce a product having a prescribed quality measure. In particular, the controller input defines one or more operational set-points of the system. The method also includes the step of providing, to the controller, one or more objective functions and a set of operational constraints relating to the non-linear process system. Moreover, the method includes the step of generating, with the controller, an adaptive non-linear control model according to the state-space model, the reference model and one or more objective functions and the set of operational constraints. The method also includes the step of receiving, with the controller from one or more sensors coupled to the system during operation of the process system, process information including values of the at least one system variable and the at least one system output. Furthermore, the method includes the step of dynamically controlling, with the processor executing the adaptive non-linear control model based on the received process information, a value of the at least one system control variable to manipulate the least one system output in accordance with the target response thereby producing a product having the prescribed quality measure.

These and other aspects, features, and advantages can be appreciated from the accompanying description of certain embodiments of the invention and the accompanying drawing figures and claims.

BRIEF DESCRIPTION OF THE DRAWINGS

FIG. 1C is a graph illustrating Bottoms Level System Output for model reference adaptive control in accordance with at least one embodiment disclosed herein;

DETAILED DESCRIPTION OF THE INVENTION

4 Objectives of the Invention

Figure 1:
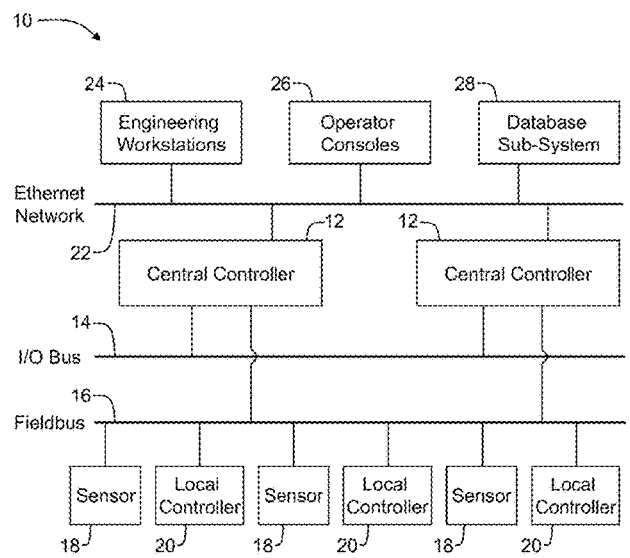
FIG. 1 is a high level diagram illustrating an exemplary process control system in accordance with at least one embodiment disclosed herein.

Illustrative embodiments of the invention will now be described more fully hereinafter with reference to the accompanying drawings, in which some, but not all embodiments of the invention are shown. Indeed, the invention may be embodied in many different forms and should not be construed as limited to the embodiments set forth herein; rather these embodiments are provided so that this disclosure will satisfy applicable legal requirements.

The objectives of the invention are listed below.

i. Model Reference Adaptive Control
  a. The invention aims to provide the ability to modify the dynamics of a nonlinear system to represent that of a linear system. In most instances the desired response will be that of a first order system where the gain and time constant are known. Additional information on Model Reference Adaptive Control can be found in Appendix A 7.1.

ii. Adaptive Reference Tracking Control
  a. The invention aims to provide regulation of a process variable for changes in reference values whether due to step responses or tracking a time varying reference signal. The invention also provides a controller which is robust and will track the reference signal in the presence of bounded input noise disturbances. Additional information on Adaptive Reference Tracking Control can be found in Appendix A 7.2.

iii. System Parameter Selection
  a. The design of the invention aims to allow the system engineer to utilize some knowledge of the control variable to determine the response which can be achieved through the system outputs and its derivatives. In addition, system parameters can be automatically defined according to pre-defined system parameters and constraints. Additional information on System Parameter Selection can be found in Appendix A 7.3.

iv. Reduced Model Identification
  a. The invention further provides a control algorithm which does not require knowledge of the entire system dynamics relating to the process variable. Through the knowledge of the system outputs and its derivatives, the control design will be developed.

v. Multivariable Control
  a. For systems which are of the type Multiple Input Multiple Output (MIMO), the invention aims to present systems and methods to utilize the available control inputs to allow the outputs to reach their respective reference values. Each output will have its specific time response and even though there will be changes in other reference values, the system is configured to respond to maintain those which have already been set unlike those control algorithms developed by de-centralized control.

vi. Stability Analysis
  a. As stability is an issue in the design of control systems, another aim of the invention is to provide systems and methods that allow the control design to be presented such that through analysis using the Lyapunov stability criteria, the stability of the system can be shown and output to an operator.

The ultimate goal of the adaptive non-linear control of various non-linear process systems is to generate a product that conforms to a particular quality metric (also referred to as a production objective). Such metrics and objectives may specify a desired outcome, result, behavior, or state, of the system process, such as, for example, a desired throughput, quality, efficiency, product profile, behavior, or cost, among others. In certain embodiments, the objective may specify at least one targeted measurable attribute defining product quality for the particular process (or the overall production process). It can be appreciated that the quality metric may be a specific value. For example, in surge drums, which are used for intermediate storage of gas which is to be transferred between chemical process units, the quality metric can be a value for the drum pressure. By way of further example, in a Bioreactor, which is a chemical vessel where processes which involve the use of biological organisms to produce a specified product, the quality metrics can relate to the substrate concentration and the biomass concentration. By way of further example, in a binary distillation column, which is a distillation system used to separate liquid mixtures which cannot be normally separated by normal distillation, a quality metric can be a defined for various products within the plant including the composition of the product at the bottom of the column and the composition of the distillate as well as liquid levels of the bottom and the distillate. It can be appreciated that a variety of different quality metrics can be defined for various attributes. These quality objectives can be defined for a specific point in a process (e.g., an end result) or defined over various stages of an ongoing process (e.g., over a time horizon) so as to provide a process trajectory that contributes to the ultimate quality of the product(s) produced with the controlled system. Accordingly, it can be appreciated that a quality metric or objective may comprise a plurality of objectives. For example quality objectives may involve sub-objectives for various stages of the production process that ultimately can relate to a global objective.

According to a salient aspect, the adaptive nonlinear controller for controlling/regulating nonlinear process systems, as further described herein, serves to minimize existing challenges in regulating nonlinear process systems and presents an effective and efficient method for precisely and accurately controlling the process system consistent with pre-defined quality-related metrics and process objectives so as to ultimately produce a product having the desired quality attributes.

As further described herein, the target behavior of the controlled process system, is represented by a target function (also referred to as the reference function) that specifies the desired response of the system. The target function represents the ideal behavior of the controlled system as a function of the prescribed controller input (e.g., one or more set-points) so as to produce a product that is consistent with the desired quality.

The exemplary systems and methods further described herein utilize the target function and the state-space model, which represents the dynamics of the non-linear system and shows the relationship between the systems inputs and the one or more outputs, as well as known constraints of the process system, its components and the controller itself, to define a control model that can be executed by the controller and that causes the regulated system to operate as specified by the target function and thereby produce a product that is consistent with various prescribed quality metrics (e.g., metrics relating to product characteristics during or after the process is complete).

FIG. 1 is a schematic block diagram of an exemplary process control system 10. System 10 includes central controllers 12, or processors, coupled to an input/output (I/O) bus 14 and a fieldbus 16. The type of input/output bus 14 and fieldbus 16 selected depends on the particular type of system being controlled, and any one of numerous known and commercially available input/output buses and fieldbuses can be used. Input/output bus 14 and fieldbus 16 are coupled to various sensors 18 and local controllers 20 coupled to the process system to be controlled (not shown). Again, the particular sensors 18 and local controllers 20 depends on the particular type of system being controlled, as is well known in the art. Exemplary process systems and their associated components are further described herein.

Central controllers 12 can also be coupled to an Ethernet based network 22. Engineering workstations 24 for use in connection with designing, creating, and maintaining system are coupled to network 22. Operator consoles 26 for operators to monitor and manually control the process also are coupled to network 22. A database sub-system 28, coupled to network 22 handles storage and retrieval of process data. Database sub-system 28 also provides version control for process control strategies.

FIG. 1 illustrates one of numerous example architectures for a process control system. The present non-linear control algorithms are not limited to use in connection with any one particular control system.

In operation, central controllers 12 receive data from various sensors 18 located at selected data points of the system to be controlled. The received data is stored by database management sub-system 28. In addition, such received data can be used by central controllers 12 and local controllers 20 to make adjustments to components of the controlled system.

Figure 2:
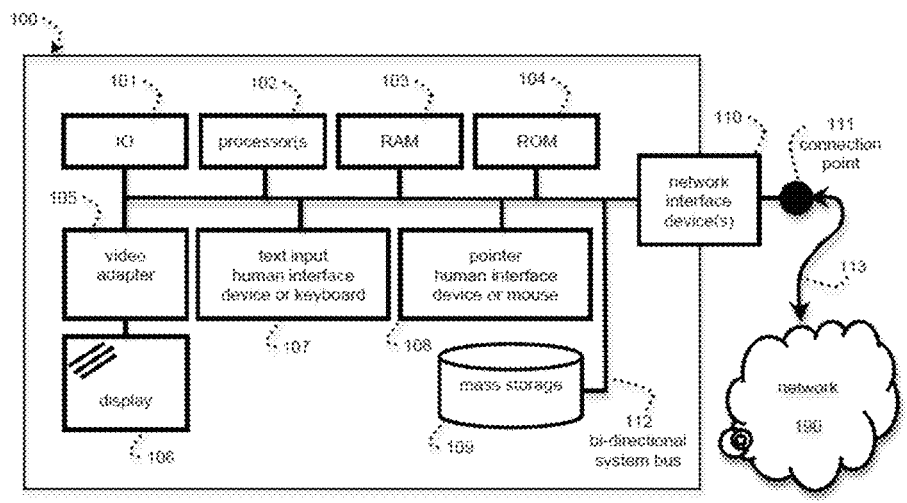
FIG. 2 is a block diagram illustrating an exemplary computing system for providing a non-linear controller in accordance with at least one embodiment disclosed herein.

FIG. 2 is a block diagram illustrating an embodiment of a computing device 100 in which an embodiment of the present invention can be implemented (e.g., engineering workstation, consoles as shown in FIG. 1).

The computing device 100 can be a general-purpose computing device such a personal computer, a laptop and so forth. A human-interface pointing device such as a mouse 108 and/or a human-interface text input device such as a keyboard 107 are preferably coupled to a bi-directional system bus 112. The human-interface devices 107 and 108 can preferably enable a user to provide input to the computing device 100 and communicate the input to a processor 102. Other suitable input devices can be used in addition to, or in place of, the mouse 108 and the keyboard 107. An I/O (Input/Output) unit 101 coupled to the bi-directional system bus 112 represents I/O systems such as a printer (not shown), an A/V (audio/video) I/O (not shown), etc.

The computing device 100 includes a video adapter 105 with its own or shared video memory (not shown), a Random Access Memory (RAM) 103 where both an application comprising computer readable code and an application state are stored at runtime, a Read Only Memory (ROM) 104 that is generally responsible for keeping system start-up computer readable code, a mass storage device 109, all coupled with the bi-directional system bus 112 along with the I/O 101, the processor 102, the keyboard 107, and the mouse 108. The mass storage device 109 can include both fixed or removable media, such as magnetic, optical, flash memory and any other available mass storage technology implementation. The computing device 100 can have an embedded and/or external video display adaptor 105 capable of presenting graphical and textual information to the user. A display 106 can connect to the video adapter 105 through a video amplifier (not shown). The video amplifier is well known in the art. One or more circuits convert digital pixels to a raster signal suitable for use by the display 106 that on its part displays a graphical image.

The computing device 100 can also include a network interface device 110 coupled to the bus 112. The network interface device 110 provides a two-way data communication coupling via a network link 113 through the device connection point 111. For example the network interface 110 can be a modem, a local area network (LAN/Ethernet) card, or a radio device. In any such implementation the network interface device 110 sends or receives electrical, electromagnetic or optical signals that carry digital data streams representing various types of information. More than one network interface devices 110 can be used. For example a Local Area Network (LAN) card can connect a computer workstation to the Internet (through an Internet Service Provider), while a wireless card can connect the workstation to a mobile device like a wireless enabled gaming device for instance.

The computing device 100 can send and receive data, including program code or web documents through the network link 113, the connection point 111, the network interface device 110 and the bus 112 to the processor 102 and then to the memory modules. The data received may be executed by the processor 102 and/or stored to the mass storage device 109.

The computing device system 100 described above are for the purposes of example only. The current and the alternative embodiments of the systems and methods for generating an adaptive non-linear control algorithm and implementing the control algorithm to control non-linear process systems can be implemented in other computing devices/processors that are capable of executing the functions described herein (e.g., central controller 12 workstations 24 and consoles 26 depicted in FIG. 1).

The term processor, as used herein, refers to central processing units, microprocessors, microcontrollers, reduced instruction set circuits (RISC), application specific integrated circuits (ASIC), logic circuits, and any other circuit, processor, or controller capable of executing the functions described herein. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the description of the exemplary systems and methods for adaptive non-linear control of process systems, the described embodiments may be implemented using computer programming and/or engineering techniques including computer software, firmware, hardware or any combination or subset thereof, wherein the technical effect is generating an adaptive non-linear control algorithm and implementing the control algorithm to control a non-linear process system. Any such resulting program, having computer-readable code, may be embodied or provided within one or more computer-readable media, thereby making a computer program product, i.e., an article of manufacture, according to the described embodiments. The computer readable media may be, for example, but is not limited to, a fixed (hard) drive, diskette, optical disk, magnetic tape, semiconductor memory such as read-only memory (ROM), and/or any non-transitory medium. The article of manufacture containing the computer code may be made and/or used by executing the code directly from one medium, by copying the code from one medium to another medium, or by transmitting the code over a network.

While the invention is described in terms of various specific embodiments, it will be recognized that the invention can be practiced with modification within the spirit and scope of this disclosure.

5 Overview of Exemplary Method for Generating Control Algorithm 5.1 Control Development of the Adaptive Nonlinear Controller The development of the new control algorithm for non-linear systems is completed, at least in part, with the development of an objective function J. For simplicity consider a first order SISO nonlinear system model which is given below.

$$\dot{x}=f(x)+g(x,u),$$

$$y=h(x),$$

Equation 5.1-1 Example First Order Nonlinear Model

Where $x \in R$ and $y \in R$. f(x), g(x,u) and h(x) all represent functions of the respective variables. As stated before, one approach to the development of a controller for this system would be to linearize the system around the desired operating points, however the resulting model is only valid for these operating points. Disturbances due to noise in the measurement system or at the controller output can force the system outside of this operating range. Similarly the effectiveness of PID solutions are based on the parameters of the linearized system.

For this system the state variable x is assumed to be bounded such that $\|x\|<c_1$ and $\|\dot{x}\|<c_2$. $c_1$ and $c_2$ are both positive numbers. Therefore for a bounded input u, the output y will be bounded. Recall that one property of this invention is to provide a desired response. For this system the response is preferred to be a first order linear which is given by the state equation $\dot{y}=-ay+bv$, where $$a = \frac{1}{\tau} \text{ and } b = \frac{K}{\tau}.$$

Figure 3A:
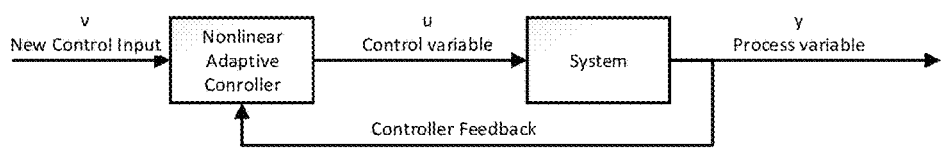
FIG. 3A is a high level diagram illustrating an exemplary configuration of a process system including a non-linear adaptive controller in accordance with at least one embodiment disclosed herein.

At this point the objective function J is generated. A plurality of pre-defined objective functions can be stored by the process controller, and a particular objective function can be selected based on the order of the particular state-space model. In addition, as further described herein, the objection function can be selected or generated based on desired response characteristics of the controlled system as defined by a reference model. In this particular example, J is defined below and v becomes the new control input. Wherein the control input is an input to the controller and defines one or more operational set-points of the system. For example and without limitation, controller input can be a target set-point of the system defined by an operator. In addition, as further described herein the control input can be a function specifying the target set-points (e.g., a trajectory of set-points) of the system over time during operation. It can also be appreciated that the control input can be a value or function provided to the control system from a human operator or automatically selected or defined by a computing device, for example, as a function of variables or parameters relating to the operation of the system. FIG. 3A is a high level system diagram showing an exemplary configuration of a process system including a non-linear adaptive controller and exemplary inputs and outputs of the system/plant and controller.

$$J=\tfrac{1}{2}(\dot{y}+ay-bv)^2$$

Equation 5.1-2 Example First Order Nonlinear Objective Function

Evaluating the above equation gives $$J = \frac{1}{2}\left(\frac{\partial h(x)}{\partial x}\dot{x} + ay - bv\right)^2$$

$$J = \frac{1}{2}\left(\frac{\partial h(x)}{\partial x}(f(x)+g(x,u)) + ay - bv\right)^2$$

It is therefore the aim that this function be minimized by the state variable u. The development of the objective function J is important to the success of the control system. The minimizer of this function is developed by selecting the gradient of J with respect to the input u, where λ is a gain chosen to increase the rate at which the function J is minimized.

$$\dot{u} = -\lambda \frac{\partial J}{\partial u}$$

$$\dot{u} = -\lambda \frac{\partial h(x)}{\partial x}\frac{\partial (g(x,u))}{\partial u}(\dot{y}+ay-bv)$$

$$\lambda > 0$$

Equation 5.1-3 Example First Order Nonlinear Controller

The system dynamics are therefore rewritten as the following below as $$\dot{x} = f(x) + g(x, u),$$

$$\dot{u} = -\lambda \frac{\partial h(x)}{\partial x} \frac{\partial (g(x,u))}{\partial u}(\dot{y} + ay - bv)$$

$$y = h(x).$$

Equation 5.1-4 First Order Nonlinear Model with Controller Dynamics

At this point, an analysis can be performed on the system to show its stability and that the response time is achieved. Objectively outputting a measure of the stability of the system is beneficial. This is achieved through the transformation of the system into the controllable canonical form. Here we let the output of the system $y=z_1$ and $\dot{y}=z_2$.

$$\dot{z}_1 = z_2$$

$$\dot{z}_2 = \left(\frac{\partial^2 h(x)}{\partial x^2}\right)\dot{x}^2 + \left(\frac{\partial h(x)}{\partial x}\right)\left(\frac{\partial f(x)}{\partial x}\dot{x} + \frac{\partial g(x,u)}{\partial x}\dot{x} + \frac{\partial g(x,u)}{\partial u}\dot{u}\right)$$

$$y = z_1$$

Equation 5.1-5 Example System Canonical Form Transformed Dynamics

Recall that $y=z_1$ and $\dot{y}=z_2$ and $x=h^{-1}(y)$ and $$\dot{x} = \dot{y}\frac{\partial h^{-1}(y)}{\partial y}$$

and therefore the transformed system is therefore rewritten as $$\dot{z}_1 = z_2$$

$$\dot{z}_2 = f_1(z_1, z_2)z_2 + f_2(z_1, z_2)\dot{u}$$

Where $$y = z_1$$

$$f_1(z_1, z_2)z_2 = \left(\frac{\partial^2 h(x)}{\partial x^2}\right)\dot{x}^2 + \left(\frac{\partial h(x)}{\partial x}\right)\left(\frac{\partial f(x)}{\partial x}\dot{x} + \frac{\partial g(x,u)}{\partial x}\dot{x}\right) \text{ and}$$

$$f_2(z_1, z_2) = \frac{\partial h(x)}{\partial x}\frac{\partial (g(x,u))}{\partial u}$$

given that the values in the original coordinate system have been successfully transformed to the z coordinate system.

Therefore by substituting for it in the equation for $\dot{z}_2$ and replacing $$f_2(z_1, z_2) = \frac{\partial h(x)}{\partial x}\frac{\partial (g(x,u))}{\partial u}, \dot{y} = z_2, y = z_1$$

into $\dot{u}$ gives $\dot{u}=-\lambda f_2(z_1,z_2)(z_2+az_1-bv)$. $\dot{z}_2$ therefore becomes $$\dot{z}_2 = f_1(z_1,z_2)z_2 - \lambda(f_2(z_1,z_2))^2(z_2+az_1-bv)$$

$$\dot{z}_2 = (f_1(z_1,z_2) - \lambda(f_2(z_1,z_2))^2)z_2 - a\lambda(f_2(z_1,z_2))^2 z_1 + b\lambda(f_2(z_1,z_2))^2 v$$

The system can therefore be rewritten in the following form $$\dot{Z} = A_z Z + B_z v$$

$$y = C_z Z$$

$$A_z = \begin{bmatrix} 0 & 1 \\ -a\lambda(f_2(z_1, z_2))^2 & (f_1(z_1, z_2) - \lambda(f_2(z_1, z_2))^2) \end{bmatrix}$$

$$B_z = \begin{bmatrix} 0 \\ b\lambda(f_2(z_1, z_2))^2 \end{bmatrix}$$

$$C_z = \begin{bmatrix} 1 & 0 \end{bmatrix}$$

$$Z = \begin{bmatrix} z_1 \\ z_2 \end{bmatrix}$$

5.2 Adaptive Nonlinear Controller Design Steps

Figure 3B:
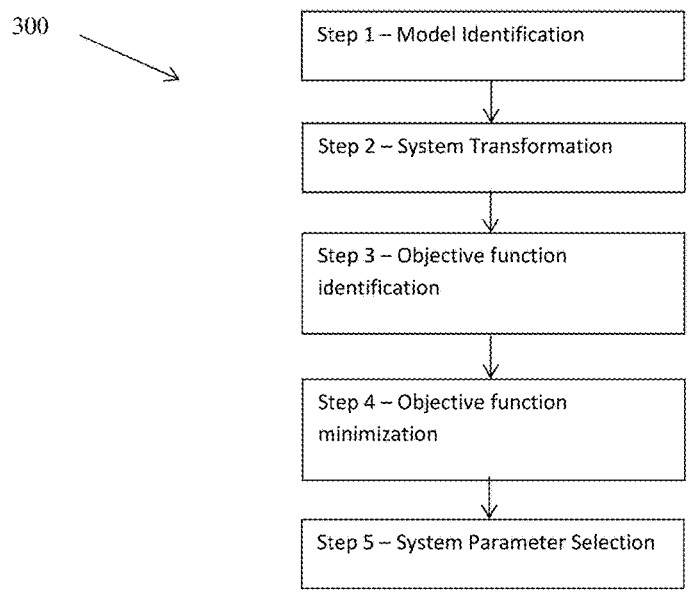
FIG. 3B is a flow diagram illustrating an exemplary routine for generating an Adaptive Nonlinear Control Algorithm in accordance with one or more of the disclosed embodiments.

The steps given below condense the design using the first order nonlinear system, for example. These steps are also shown as routine 300 in FIG. 3B and further described herein in connection with a variety of practical implementations.

Step 1—Model Identification

A state space model of the system is first required. The state space model represents the dynamics of the system and shows the relationship between the systems inputs and their outputs. This model can be derived from first principles as these relationships are usually known.

Another method to identify the dynamics is with the use of model identification techniques. Neural networks can be used to map the dynamics of a system where the behavior is unknown.

$$\dot{x}=f(x)+g(x,u)$$

$$y=h(x)$$

Step 2—System Transformation

From the system dynamics, the relationship between the output and the desired control input can be determined.

In the event that the control input is not within the first derivative of the output, the output is differentiated repeatedly until the desired control input appears in one of the equations. The differentiation of the output places the system in the controllable canonical form.

$$\dot{y} = \frac{\partial h(x)}{\partial x}(f(x) + g(x,u))$$

Step 3—Objective Function Creation

The objective function contains the dynamic relations of the output as they relate to the control input and the desired behavior of the output.

The objective function can be chosen for either reference tracking or model referencing behavior. For further information on these two control actions please see Appendix A 7.1 and 7.2.

Starting with the model reference objective function, the reference tracking objective function can be obtained by allowing $v=1/b(\dot{y}+ay-\dot{e}-k_c e)$. $\dot{e}=\dot{y}-\dot{r}$ and $e=y-r$, where r and $\dot{r}$ are the reference signal and the derivative of the reference signal respectively. In both cases the control algorithm will aim to achieve either criteria set.

$$J=\frac{1}{2}(\dot{y}+ay-bv)^2$$

Model Reference Behavior $$j = \tfrac{1}{2}(\dot{e} + k_c e)^2$$

Reference Tracking

Step 4—Objective Function Minimization

The objective function is minimized using the desired control variable. The derivative of the objective function is taken with respect to the control variable. The function obtained is the gradient of the objective function with regards to the control variable.

Therefore the negative gradient is used to minimize the objective function. The negative gradient with respect to the control variable is used as the derivative of the control variable. Here the gain lambda is chosen to manipulate the speed at which the objective function approaches its minimum value. The purpose of $\lambda$ is to manipulate the rate at which the objective function is minimized.

$$\dot{u} = -\lambda \frac{\partial J}{\partial u}$$

$$\dot{u} = -\lambda \frac{\partial h(x)}{\partial x} \frac{\partial g(x, u)}{\partial u} (\dot{y} + ay - bv)$$

Step 5—System Parameter Selection

Given that the previous steps have been successfully completed, there are several parameters which need to be selected.

The gain lambda is selected to satisfy the following conditions where $$(\dot{y})^2_{min} \left( \frac{\partial h(x)}{\partial x} \frac{\partial g(x, u)}{\partial u} \right)^2_{min} \neq 0 \text{ and}$$

$$(\dot{y})^2_{max} \left( \frac{\partial h(x)}{\partial x} \frac{\partial g(x, u)}{\partial u} \right)^2_{max} \neq 0$$

$$\dot{u}_{min} < -\lambda \frac{\partial h(x)}{\partial x} \frac{\partial g(x, u)}{\partial u} (\dot{y} + ay - bv) < \dot{u}_{max}$$

The values of a and b are chosen to satisfy the following equation for the bounded values of the output $$\dot{y}_{min} < (-ay + bv) < \dot{y}_{max}$$

5.3 Observations

Recall certain objectives of the invention which were presented in Section 4: Objectives of the Invention are listed below i. Model Reference Adaptive Control
ii. Adaptive Reference Tracking Control
iii. System Parameter Selection
iv. Reduced Model Identification
v. Multivariable Control
vi. Stability Analysis 5.3.1 Model Reference Adaptive Control To explain how this requirement is achieved, the analysis begins with the objective function J from section 5.1.

$$J = \tfrac{1}{2}(\dot{y} + ay - bv)^2$$

Note that when this function is equal to J=0 that $\dot{y} = -ay + bv$ and since the control variable u is used to bring the value of J to its minimum the system being controlled will therefore have the dynamics of a system where $$a = \frac{1}{\tau} \text{ and } b = \frac{K}{\tau},$$

where $\tau$ is the time constant and K is the gain. Therefore it is required that the control variable u have a response time which is capable of minimizing the objective function J.

5.3.2 Adaptive Reference Tracking Control

Given that the control variable is able to minimize the objective function J by decreasing J to zero, the new input variable v can be used for reference tracking of an input signal. A new control input is required as the previous control variable u is now a state variable of the system. This is achieved by allowing $$v = \frac{1}{b}(ay + \dot{r} - k_c(y - r))$$

where r and $\dot{r}$ is reference signal and derivative of the reference signal respectively. $k_c$ is the constant chosen to specify the response time of the error system. Note $$k_c = \frac{1}{\tau_c}$$

$$J = \tfrac{1}{2}(\dot{y} - \dot{r} + k_c(y - r))^2$$

$$J = \tfrac{1}{2}(\dot{e} + k_c e)^2$$

Therefore at the minimum $\dot{e} = -k_c e$ and as the as the pole of the error system is negative, the error between the output and reference signal will approach zero. This can be observed on the process trends as the output variable approaches the desired setpoint. Model reference control and adaptive reference tracking control are further described herein.

5.3.3 System Parameter Selection

Recall that there are bounds which have been placed on the output y and its derivatives. Therefore the parameters for $\lambda$, a and b are chosen such that following inequalities are satisfied for the operating region of the system. Further information on the system parameter selections is explained in 7.4.

$$\dot{u}_{min} < -\lambda \frac{\partial h(x)}{\partial x} \frac{\partial g(x, u)}{\partial u} (\dot{y} + ay - bv) < \dot{u}_{max}$$

$$\dot{y}_{min} < (-ay + bv) < \dot{y}_{max}$$

5.3.4 Reduced Model Identification

For the control design being presented, the derivation of the new control dynamics it indicate that the product of the functions $$\frac{\partial g(x, u)}{\partial u} \text{ and } \frac{\partial h(x)}{\partial x}$$

are required as shown in the equation below.

$$\dot{u} = -\lambda \frac{\partial h(x)}{\partial x} \frac{\partial g(x, u)}{\partial u} (\dot{y} + ay - bv)$$

In most cases the function h(x)=x and therefore, the function containing the state variable is required. The output y and its derivatives can be easily obtained from the output.

5.3.5 Multivariable Control

Multivariable control applies to systems where there are multiple process variables which are to be controlled. Each process variable will be assigned a control variable. There are two methods which can be utilized. In both methods, an objective function is required for each process variable.

The first method minimizes the respective process variable objective function with respect to the assigned control variable. The second minimizes an objective function which is a function of the individual objective functions. For multivariable control the objective function is a function of the individual objective functions. For further information see Appendix A 7.4.3.2 Multiple Objective Function Selection.

5.3.6 Stability Analysis

The stability analysis of the system can be performed by determining the characteristic equation of the system in the controllable canonical form or applying Lyapunov's stability criteria.

5.3.6.1 Method 1—Characteristic Equation

It can be assumed that the functions $f_1(z_1,z_2)$ and $f_2(z_1,z_2)$ obtained from Section 5.1 are bounded within the operating range of the system. $\theta_1, \theta_2, \theta_3, \theta_4$ represent the bounds of the two functions.

$$\theta_1 < f_1(z_1,z_2) < \theta_2$$

$$\theta_3 < f_2(z_1,z_2) < \theta_4$$

The characteristic equation for the system is obtained by linearizing the state matrix $A_z$ to form the linearized matrix $\tilde{A}_z$. Examining the eigenvalues of the system it can be seen that once $\lambda$ is large the system eigenvalues will all be negative for the defined operating values Having the eigenvalues all remain negative signify that the system will be stable. An example plot of the eigenvalues for one of the systems has been presented in Appendix B 8.1.

5.3.6.2 Method 2—Lyapunov's Stability Analysis

To apply the Lyapunov's stability it is more efficient for the system to be in the controllable canonical form. Here the matrix $A_z$ will be used. The Lyapunov objective function is chosen below for stability.

$$V = Z^T I Z$$

Where Z represents the state vector in the controllable canonical form and I is the identity matrix. The derivative of the system is taken $$\dot{V} = \dot{Z}^T I Z + Z^T I \dot{Z}$$

$$\dot{V} = (\tilde{A}_z Z + \tilde{B}_z v)^T I Z + Z^T I ((\tilde{A}_z Z + \tilde{B}_z v))$$

$$\dot{V} = (Z^T \tilde{A}_z^T + v^T \tilde{B}_z^T) I Z + Z^T I (\tilde{A}_z Z + \tilde{B}_z v)$$

$$\dot{V} = Z^T (\tilde{A}_z^T I + I \tilde{A}_z) Z + v^T \tilde{B}_z^T I Z + Z^T I \tilde{B}_z v$$

For the moment the new control input v=0 and therefore $$\dot{V} = Z^T (\tilde{A}_z^T I + I \tilde{V}_z) Z$$

$$\dot{V} \leq 0$$

Selecting appropriate values for $\lambda$, a and b the inner sum $\tilde{A}_z^T I + I \tilde{V}_z = -Q_z(t)$ where $Q_z(t)$ is a time varying semi positive definite matrix.

6 System Examples

To further illustrate the behavior of the exemplary systems and methods for adaptive nonlinear control in practice, several examples will be presented in which the systems and methods for generating adaptive non-linear control algorithms are incorporated and implemented to regulate/control real process systems. These systems have been analyzed to develop models which approximate the systems nonlinear behavior. A brief description of the systems are presented below.

System 1—DC Motor
   A DC motor is a common electromechanical device that is used in many applications.

System 2—Liquid/Gas Drum
   Surge drums are used for intermediate storage of gas which is to be transferred between chemical process units.

System 3—Bioreactor
   A bioreactor is a chemical vessel where processes which involve the use of biological organisms to produce a specified product.

System 4—Binary Distillation Column
   A binary distillation column is a distillation system used to separate liquid mixtures which cannot be normally separated by normal distillation.

6.1 DC Motor

6.1.1 Description

Figure 4:
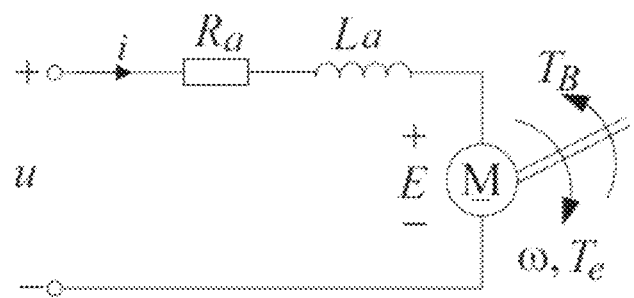
FIG. 4 is a high-level circuit diagram modeling an exemplary DC motor circuit controlled in accordance with one or more of the disclosed embodiments.

DC motors are quite common electromechanical systems that can be found in many industries. They are used in simple applications such as remote control toys to more complex applications where they propel electric locomotives and robotic arms. FIG. 4 is a high-level circuit diagram modeling an exemplary DC motor circuit and is further described herein. Although most models of a DC generally do not include any nonlinearities, they do exist. However the second order linear model will be used to show that the controller is not only bounded to the use of nonlinear systems.

$$\dot{\omega} = -K_1 \omega + K_2 i$$

$$\dot{i} = -K_4 \omega + K_3 i + K_5 u$$

$$y = \omega$$

Equation 6.1-1 DC Motor State Space Dynamics

The parameters of the model are given as $$K_1 = \frac{B}{J}, K_2 = \frac{K_t}{J}, K_3 = \frac{R_a}{L_a}, K_4 = \frac{K_e}{L_a} \text{ and } K_5 = \frac{1}{L_a}$$

The following table describes the parameters and values, wherein the values are obtained from testing and analysis of the system components.

TABLE 6-1

| DC Motor Parameter Table | | |
|---|---|---|
| Parameter | Description | Value |
| B | Viscous friction coefficient | 0.1 (N · m · s/rad) |
| J | Rotor inertia moment | 0.01 (Kg · m$^2$) |
| $K_t$ | Torque Coefficient of the motor | 0.01 (N · m/A) |
| $R_a$ | Equivalent armature resistance | 1 (ohm) |
| $L_a$ | Equivalent armature inductance | 0.5 (H) |
| $K_e$ | Voltage coefficient | 0.1 (N · m/A) |

6.1.2 Exemplary Instruments Requirements

In the exemplary implementation, the objective is to regulate the speed of the system. Therefore a tachometer is required to send the speed measurements to the control system.

There are several instruments which can be used in a control system for of the motor, including, for example, and without limitation:

Ammeter
- The ammeter is used to measure the current which flow through the coils of the motor. This measurement can be used to determine when there is a fault in the motor to disable the speed control system. The ammeter will provide a 4-20 mA signal which is transmitted to the PLC Tachometer
- The tachometer is used to measure the speed at which the motor is operating. In most process applications, the signal will be transmitter to the PLC by a 4-20 mA signal.

DC Motor Drive
- The DC motor drive provides the voltage signal to drive the motor. The PLC would provide a 4-20 mA signal for which the DC Motor Drive would then scale the output signal from the PLC to drive the DC Motor.

6.1.3 Exemplary Implementation
6.1.3.1 Control Development
6.1.3.1.1 Step 1—Model Identification The second order model for the system is given below in the following equations. The system below does not include any nonlinearities and therefore can be considered linear $$\dot{\omega} = -K_1\omega + K_2 i$$

$$\dot{i} = -K_4\omega + K_3 i + K_5 u$$

$$y = \omega$$

6.1.3.1.2 Step 2—System Transformation

However the control equation u is in the equation for the state i, therefore the output y is differentiated until the equation is obtained. The process presented below describes Step 2.

The system is transformed into the controllable canonical form using the steps below.

$$z_1 = y = \omega$$

$$z_2 = \dot{y} = \dot{\omega} = -K_1\omega + K_2 i$$

Taking the derivative of the new state variables provides the following equations.

$$\dot{z}_1 = z_2$$

$$\dot{z}_2 = -K_1\dot{\omega} + K_2\dot{i}$$

Substituting for the differential of i into the equation for $\dot{z}_2$ gives $$\dot{z}_2 = -K_1\dot{\omega} + K_2(-K_4\omega + K_3 i + K_5 u)$$

$$\dot{z}_2 = -K_1\dot{\omega} - K_2K_4\omega + K_2K_3 i + K_2K_5 u$$

Recall that $$i = \frac{\omega}{K_2} + \frac{K_1\omega}{K_2},$$

$\omega = z_1$ and $\dot{\omega} = z_2$. Therefore substituting into the equation for $\dot{z}_2$ gives $$\dot{z}_2 = -K_1 z_2 - K_2 K_4 z_1 + K_2 K_3 \left( \frac{z_2}{K_2} + \frac{K_1 z_1}{K_2} \right) + K_2 K_5 u$$

$$\dot{z}_2 = -K_1 z_2 - K_2 K_4 z_1 + K_3 z_2 + K_1 K_3 z_1 + K_2 K_5 u$$

$$\dot{z}_2 = -(K_2 K_4 - K_1 K_3) z_1 - (K_1 - K_3) z_2 + K_2 K_5 u$$

Therefore the system in the controllable canonical form is presented below.

$$\dot{z}_1 = z_2$$

$$\dot{z}_2 = -(K_2 K_4 - K_1 K_3) z_1 - (K_1 - K_3) z_2 + K_2 K_5 u$$

$$y = z_1$$

6.1.3.1.3 Step 3—Objective Function Identification

Now that the system has successfully been transformed the objective function can be created. The objective function is defined such that the resulting system is stable. More specifically, the objective function is generated or selected from stored objective functions. In addition, the particular objective function among the stored functions is selected/generated based on the order of the state-space model. Moreover, as further described herein, the objective function is identified based on the desired dynamics of the controlled system, including, as further described herein, whether the controller will be implemented in a model reference adaptive control configuration or a reference adaptive control configuration.

$$J = \tfrac{1}{2}(\dot{z}_2 + a_2 z_2 + a_1 z_1 - bv)^2$$

$$J = \tfrac{1}{2}(-(K_2 K_4 - K_1 K_3) z_1 - (K_1 - K_3) z_2 + K_2 K_5 u + a_2 z_2 + a_1 z_1 - bv)^2$$

6.1.3.1.4 Step 4—Objective Function Minimization

The function is differentiated with respect to the input u.

$$\frac{\partial J}{\partial u} = K_2 K_5 (-(K_2 K_4 - K_1 K_3) z_1 - (K_1 - K_3) z_2 + K_2 K_5 u + a_1 z_2 + a_2 z_1 - bv)$$

$$\frac{\partial J}{\partial u} = K_2 K_5 (\dot{z}_2 + a_2 z_2 + a_1 z_1 - bv)$$

The control derivative now becomes.

$$\dot{u} = -\lambda K_2 K_5 (\dot{z}_2 + a_2 z_2 + a_1 z_1 - bv)$$

The dynamics of the system now become $$\dot{z}_1 = z_2$$

$$\dot{z}_2 = -(K_2 K_4 - K_1 K_3) z_1 - (K_1 - K_3) z_2 + K_2 K_5 u$$

$$\dot{u} = -\lambda K_2 K_5 (\dot{z}_2 + a_2 z_2 + a_1 z_1 - bv)$$

$$y = z_1$$

6.1.3.1.5 Step 5—System Parameter Selection

The parameters of the system are chosen such that $$\dot{u}_{min} < -\lambda K_2 K_5 (\ddot{y} + a_1 \dot{y} + a_2 y - bv) < \dot{u}_{max}$$

$$\ddot{y}_{min} < -a_1 \dot{y} - a_2 y + bv < \ddot{y}_{max}$$

6.1.3.1.5.1 Lambda Selection

| Parameter | Description | Value |
|---|---|---|
| $c_u$ | Minimum magnitude of either $\dot{u}_{min}$ or $\dot{u}_{max}$ | 50 |
| $c_b$ | Maximum magnitude of either $(K_2K_5)_{min}$ or $(K_2K_5)_{max}$ | 2 |
| $c_{y2}$ | Minimum magnitude of either $\ddot{y}_{min}$ or $\ddot{y}_{max}$ | 0.5 |
| $\lambda$ | $\lambda = \dfrac{c_u}{c_b(2c_y)}$ | 50 |

6.1.3.1.5.2 Coefficient Selection

Because the system to be controlled is of an order higher than 1 the following modification has to be made to the coefficient selection. The value of $a_1$ and $a_2$ are selected such that the eigenvalues are negative.

| Parameter | Description | Value |
|---|---|---|
| $c_x$ | Maximum magnitude of either $y_{min}$ or $y_{max}$ | 30 |
| $c_{y1}$ | Maximum magnitude of either $\dot{y}_{min}$ or $\dot{y}_{max}$ | 0.5 |
| $c_{y2}$ | Maximum magnitude of either $\ddot{y}_{min}$ or $\ddot{y}_{max}$ | 0.5 |
| b | Gain parameter | $b = a_1$ |

$c_{y2} > 2a_1 c_{y1} + a_2 c_{y2}$

6.1.3.2 Exemplary Results

To illustrate the benefits of the exemplary control system, a test of the system response is illustrated against target response characteristics. In particular, in this example, it is desired that the controlled DC motor reflect a system with the following dynamics where $b=0.01, a_1=0.01$ and $a_2=0.2$. The parameters that have been selected represent a model with eigenvalues at 0.1 and 0.1. In classical control the system would have a natural frequency of 0.1 and a damping ratio of 1.

$\dot{x}_1 = x_2$ $\dot{x}_2 = -a_1 x_1 - a_2 x_2 + bv$

The values of the new control input v are presented below.

TABLE 6-2

DC Motor Model Reference Input Table

| Input v | Time (secs) |
|---|---|
| 10 | $0 \leq t < 1000$ |
| 15 | $1000 \leq t < 2000$ |
| 20 + 5(cos(t/75)) | $2000 \leq t < 3000$ |
| 10 | $3000 \leq t < 4000$ |
| 15 | $t \geq 4000$ |

6.1.3.2.1 Model Output Signal

Figure 5A:
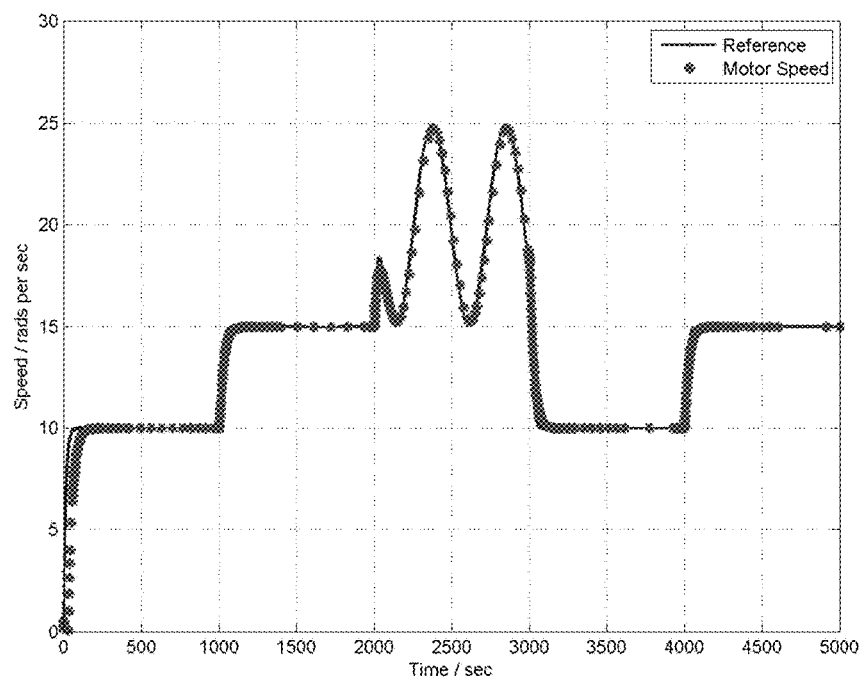
FIG. 5A is a graph illustrating the DC Motor Speed Response and Motor Reference Model Speed Response for model reference adaptive control.
Figure 5B:
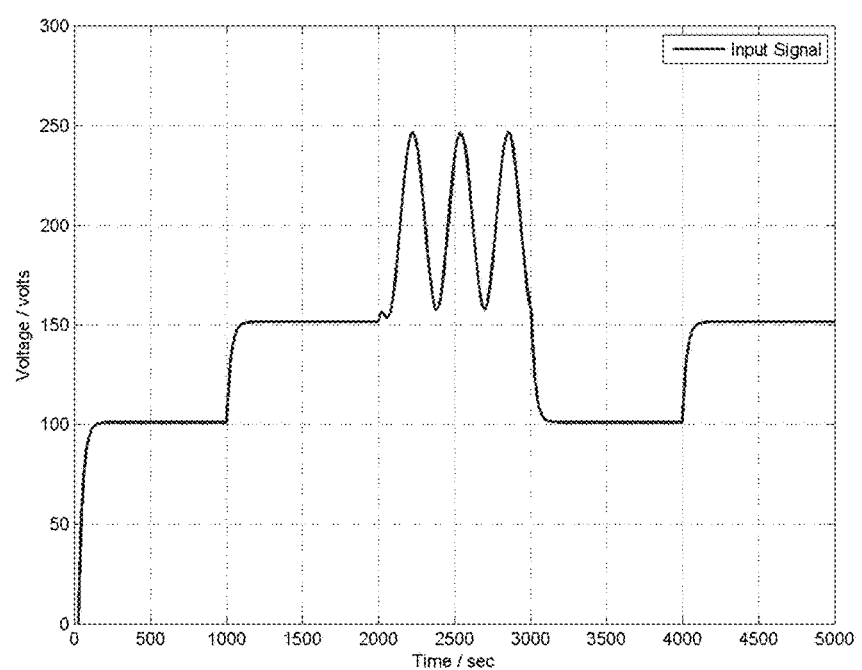
FIG. 5B is a graph illustrating the Motor Input Voltage for model reference adaptive control in accordance with at least one embodiment disclosed herein.
Figure 5C:
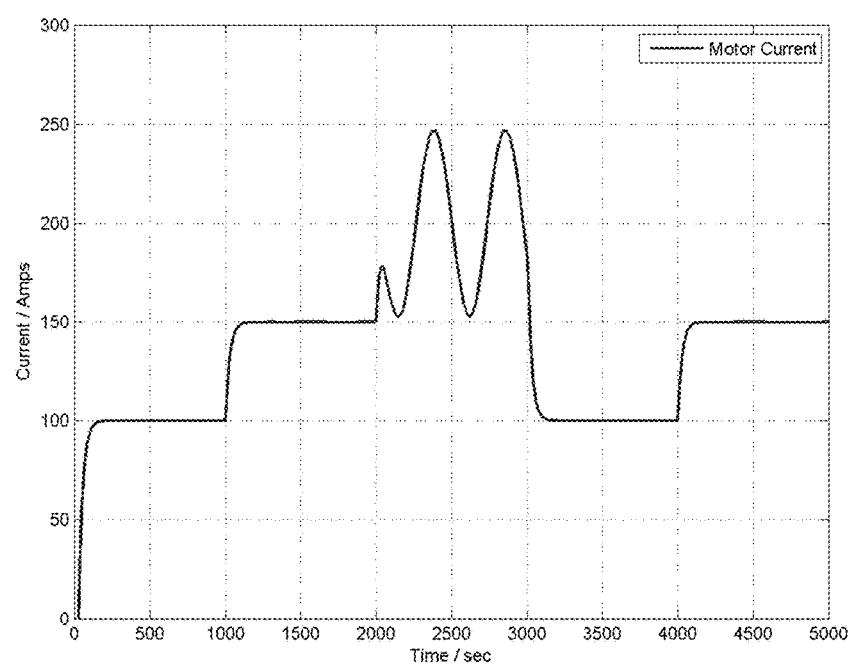
FIG. 5C is a graph illustrating DC Motor Armature Current for model reference adaptive control.

FIG. 5A is a diagram illustrating the DC Motor Speed Response and Motor Reference Model Speed Response for model reference adaptive control. The diagram shows the behavior of the output motor speed as it is compared to the reference model. The diagram shows that the system response of the system behaves similar to the desired second order reference model. FIG. 5B is a graph illustrating the Motor Input Voltage for model reference adaptive control in accordance with at least one embodiment disclosed herein. FIG. 5C is a graph illustrating DC Motor Armature Current for model reference adaptive control.

6.1.3.3 Comments

For the exemplary implementation, the adaptive nonlinear controller produced the desired output dynamics specified by the model reference system as shown in the graph for the model output. Note that in the graphs the other state variable which is the armature current was also bounded. Although the system consisted of many parameters, only the constants $K_2$ and $K_5$ were required to be known in order to generate the control model design along with the output y and its derivatives.

Generally speaking, the values of $K_2$ and $K_5$ will vary with time, however as they are positive values the impact is mitigated by the choice of the adaptive gain $\lambda$. The expected ranges of the deviations of $K_2$ and $K_5$ can be factored into the inequalities which specify the appropriate choice of the adaptive gain $\lambda$.

6.2 Gas Surge Drum

6.2.1 Description

Figure 6:
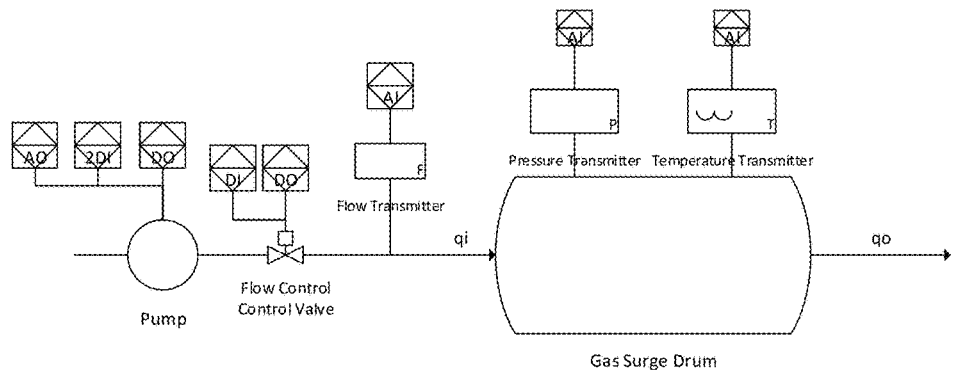
FIG. 6 is a high level piping and instrumentation diagram illustrating an exemplary Gas Surge Drum controlled in accordance with one or more of the disclosed embodiments.

A surge drum is used for the intermediate storage of gaseous material in process plants. Various control problems exist in such process systems that can be controlled in accordance with the disclosed embodiments. For example and without limitation, one example control problem requires that the drum pressure be controlled by either the input or output flow rates. FIG. 6 is a high level piping and instrumentation diagram illustrating an exemplary Gas Surge Drum. The diagram also indicates the connections which would be made to the Programmable Logic Controller (PLC) implementing the adaptive non-linear control algorithm, as further described herein.

The dynamics of a gas drum can represented using the equation below.

$$\frac{dP}{dt} = \frac{RT}{V} q_i - \frac{RT}{V} \beta \sqrt{P - P_h}$$

Equation 6.2-1 Surge Drum State Space Dynamics

A description of the parameters and variables and corresponding values are listed in the below tables:

TABLE 6-3

Surge Drum Parameter/Variable Description

| Parameters/Variables | Description |
|---|---|
| R | Universal gas constant (constant) |
| P | Drum Pressure (variable) |
| $P_h$ | Downstream header pressure (constant) |
| $\beta$ | Flow coefficient (constant) |
| V | Drum Volume (constant) |
| $q_i$ | Input flowrate (input variable) |
| T | Drum Temperature (constant) |

TABLE 6-4

Surge Drum Parameter Values

| Parameter | Value |
|---|---|
| R | 1.31443 atm · ft$^3$/(mol · K) |
| $P_h$ | 1 atm |
| $\beta$ | 1 mol · s$^{-1}$ · atm $^{-1/2}$ |
| V | 100 ft$^3$ |
| T | 303.15 K |

6.2.2 Exemplary Sensory Requirements

There are several instruments which are generally required to control the pressure of the drum, for example, and without limitation:

Flow Meter

The flow meter measures the input flow rate into the drum. In industrial environments, this instrument interfaces with the PLC through a 4-20 mA analog signal.

Temperature Sensor

The temperature sensor measures the temperature inside the drum. In industrial environments, this instrument interfaces with the PLC through a 4-20 mA analog signal.

Pressure Sensor

Pressure is the process variable which is intended to be controlled. In industrial environments, this instrument interfaces with the PLC through a 4-20 mA analog signal.

Flow Pump

The flow pump controls the flow to the drum. The speed at which the pump is operated is sent through a 4-20 mA signal. The pump provides feedback information through a 0/24 VDC digital signal where 0 VDC represents a logic 0 and 24 VDC represent a logic 1.

Flow Control Valve

The flow control valve is controlled by the PLC and it accepts a digital output from the PLC in the form of a 0/24 VDC range.

6.2.3 Exemplary Implementation

6.2.3.1 Control Development

6.2.3.1.1 Step 1—Model Identification

The second order model for the system is given below in the following equations.

$$\dot{P} = \frac{RT}{V}q_i - \frac{RT}{V}\beta\sqrt{P - P_h}$$
$$y = P$$

6.2.3.1.2 Step 2—System Transformation

The system shown is a first order system and therefore the state equation which contains the control variable $q_i$ is found in the first derivative of the output.

6.2.3.1.3 Step 3—Objective Function Identification

The system is a first order system and therefore does not require transformation. The objective function is chosen such that the system is stable. In particular, the following objective function is selected based on the order of the state-space model.

$$J = \frac{1}{2}(\dot{y} + ay - bv)^2$$
$$J = \frac{1}{2}\left(\frac{RT}{V}q_i - \frac{RT}{V}\beta\sqrt{P - P_h} + aP - bv\right)^2$$

6.2.3.1.4 Step 4—Objective Function Minimization

The function is differentiated with respect to the input $q_i$.

$$\frac{\partial J}{\partial q_i} = \frac{RT}{V}\left(\frac{RT}{V}q_i - \frac{RT}{V}\beta\sqrt{P - P_h} + aP - bv\right)$$

-continued $$\frac{\partial J}{\partial q_i} = \frac{RT}{V}(\dot{P} + aP - bv)$$

The control derivative now becomes.

$$\dot{q}_i = -\lambda\frac{\partial J}{\partial q_i}$$
$$\dot{q}_i = -\lambda\frac{RT}{V}(\dot{P} + aP - bv)$$

The dynamics of the system now become $$\dot{P} = \frac{RT}{V}q_i - \frac{RT}{V}\beta\sqrt{P - P_h}$$
$$\dot{q}_i = -\lambda\frac{RT}{V}(\dot{P} + aP - bv)$$
$$y = P$$

6.2.3.1.5 Step 5—System Parameter Selection

Further information on the steps for system parameter selection can be found in 7.4.

$$\dot{q}_{i_{min}} < -\lambda RT/V(\dot{P}+aP-bv) < \dot{q}_{i_{max}}$$

$$\dot{y}_{min} < -aP+bv < \dot{y}_{max}$$

6.2.3.1.5.1 Lambda Selection

| Parameter | Description | Value |
|---|---|---|
| $c_u$ | Minimum magnitude of either $\dot{u}_{min}$ or $\dot{u}_{max}$ | 39.8450 |
| $c_b$ | Maximum magnitude of either $\left(\frac{RT}{V}\right)_{min}$ or $\left(\frac{RT}{V}\right)_{max}$ | 0.7969 |
| $c_y$ | Minimum magnitude of either $\dot{x}_{min}$ or $\dot{x}_{max}$ | 5 |
| $\lambda$ | $\lambda = \frac{c_u}{c_b(2c_y)}$ | 5 |

6.2.3.1.5.2 Coefficient Selection

| Parameter | Description | Value |
|---|---|---|
| $c_x$ | Maximum magnitude of either $x_{1_{min}}$ or $x_{1_{max}}$ | 40 |
| $c_y$ | Minimum magnitude of either $\dot{x}_{1_{min}}$ or $\dot{x}_{1_{max}}$ | 3 |
| a | $\frac{c_y}{2c_x} > a$ | $0 < a < 0.0625$ |
| b | Gain Parameter | b = a |

6.2.3.2 Results

To illustrate the benefits of the exemplary control system, a test of the system response is illustrated against target response characteristics. In particular, in this example, it is desired that the controlled Surge Drum reflect a system with the following dynamics where b=0.05 and a=0.05. The system therefore has a time constant of $$\tau = \frac{1}{0.05} = 20 \text{ seconds}.$$

Therefore for a step input with a magnitude change of 1, the output will change by approximately 63% after 20 seconds has passed. Since b has a value of 0.05, the gain of the input-output is 1.

$$\dot{x}_1 = -ax_1 + bv$$

TABLE 6-5

Surge Drum Model Reference Input Table

| Input v | Time (secs) |
| --- | --- |
| 10 | 0 ≤ t < 1000 |
| 30 + 7.5(cos(t/70)) | 1000 ≤ t < 2000 |
| 15 | 2000 ≤ t < 3000 |
| 20 + 5(sin(t/50)) | 3000 ≤ t < 4000 |
| 5 | t ≥ 4000 |

6.2.3.2.1 Model Output Signal

Figure 7A:
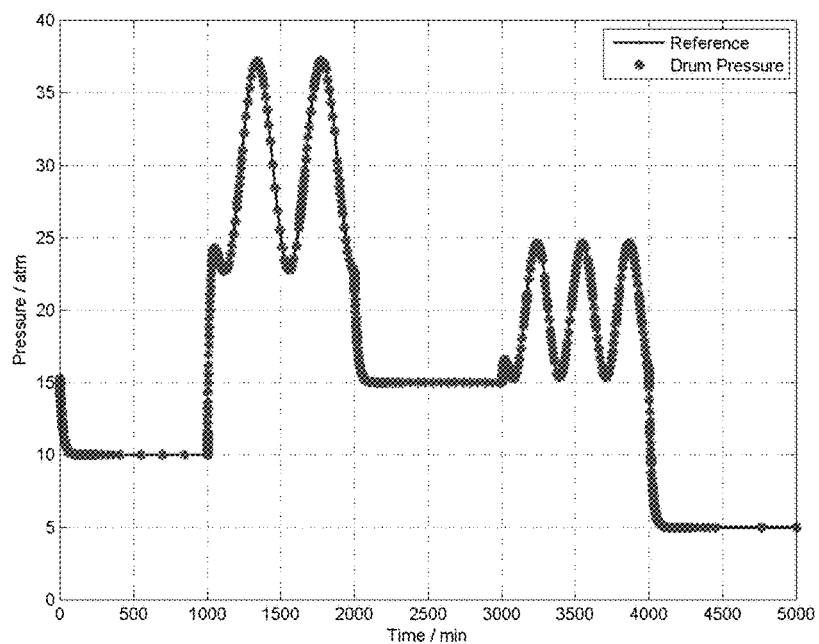
FIG. 7A is a graph illustrating the Surge Drum Pressure and Reference Model Pressure for model reference adaptive control in accordance with at least one embodiment disclosed herein.
Figure 7B:
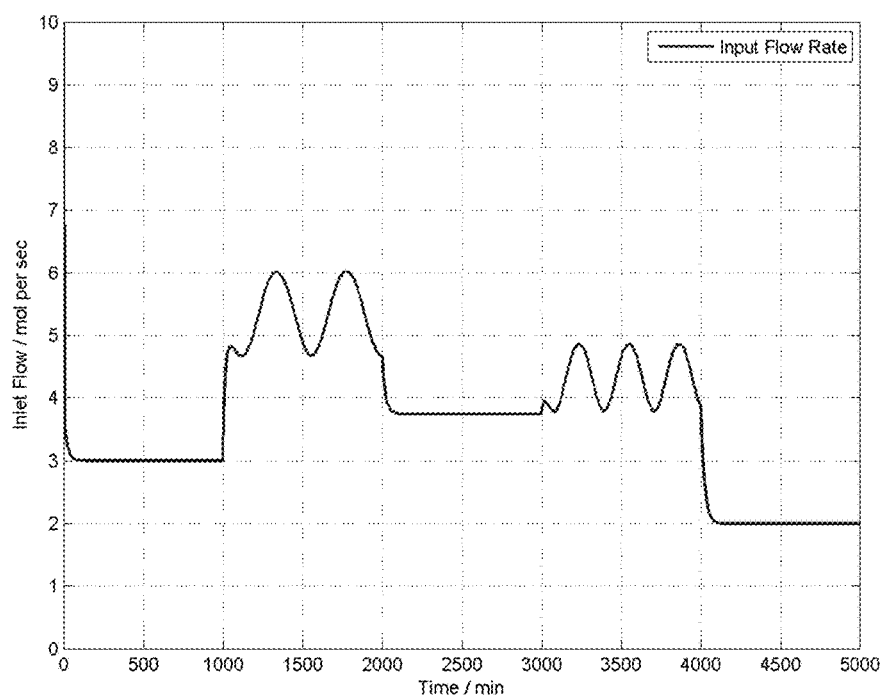
FIG. 7B is a graph illustrating the Surge Drum Input Flow rate for model reference adaptive control in accordance with at least one embodiment disclosed herein.

FIG. 7A is a graph illustrating the Surge Drum Pressure and Reference Model Pressure for model reference adaptive control in accordance with at least one embodiment disclosed herein. The figure shown above shows that the system behavior is similar to the desired first order reference model with respect to the step changes and sinusoidal signals. FIG. 7B is a graph illustrating the Surge Drum Input Flow rate for model reference adaptive control in accordance with at least one embodiment disclosed herein. From the two graphs provided, the first graph shows that the controller executing the control algorithm is able to control the system in a manner that replicates the dynamic behavior of the reference model. The control input requires knowledge of three parameters which are V, R, and T. In practice the temperature T will vary. However the design of the control algorithm can be configured to incorporate this expected change into the method for selection of the parameters.

6.3 Bioreactor 6.3.1 Description

Figure 8:
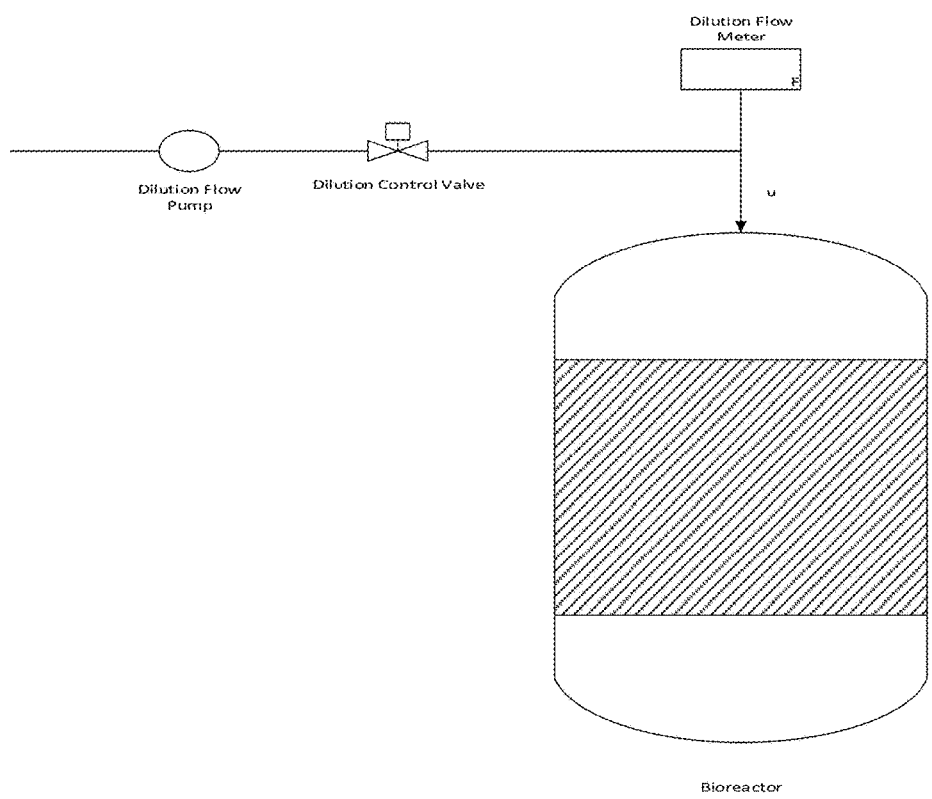
FIG. 8 is a high level piping and instrumentation diagram illustrating an exemplary bioreactor system to be controlled in accordance with one or more of the disclosed embodiments.

FIG. 8 is a high level piping and instrumentation diagram illustrating an exemplary bioreactor system to be controlled in accordance with one or more of the disclosed embodiments. The system shown represents the dynamics of a bioreactor system. The system states are the substrate concentration $x_2$ and the biomass concentration $x_1$. The system has the two inputs which are the dilution rate u and the input substrate concentration $s_{in}$. The control variable which will be selected will be the dilution rate u.

$$\dot{x}_1 = \frac{a_1 x_1 x_2}{x_2 + a_2} - u x_1$$

$$\dot{x}_2 = -\frac{a_3 a_1 x_1 x_2}{x_2 + a_2} - u x_2 + s_{in} u$$

$$y = x_1$$

Equation 6.3-1 Bioreactor State Space Dynamics

| Parameter | Description | Value |
| --- | --- | --- |
| $a_1$ | Maximum specified growth rate | 1 |
| $a_2$ | Saturation constant | 1 |
| $a_3$ | Biomass Coefficient | 1 |

6.3.2 Exemplary Instrument Requirements

There are several instruments which would be required to control the compositions of the bioreactor. The list provides an example of the equipment which would generally be associated with the bioreactor. Not all instruments provided in the listed are used to provide measurements to the controller for use in applying the nonlinear control algorithm.

Flow Meter

The flow meter measures the input flow rate into the bioreactor. In industrial environments, this instrument interfaces with the PLC through a 4-20 mA analog signal.

Temperature Sensor

The temperature sensor measures the temperature inside the bioreactor. In industrial environments, this instrument interfaces with the PLC through a 4-20 mA analog signal.

Dilution Pump

The dilution pump provides the bioreactor with substrate concentration. The pump drive will accept speed settings from the PLC in the form of a 4-20 mA analog signal.

Biomass Concentration Sensor

The biomass can be monitored by monitoring the gases produced by the activity of the biomass. The concentration measurement is provided to the PLC in the form of a 4-20 mA analog signal.

Volume Sensor

The volume sensor measures the volume of material with is located in the reactor. The volume measurement is provided to the PLC in the form of a 4-20 mA analog signal.

6.3.3 Exemplary Implementation 6.3.3.1 Control Development 6.3.3.1.1 Step 1—Model Identification $$\dot{x}_1 = \frac{x_1 x_2}{x_2 + 1} - u x_1$$

$$\dot{x}_2 = -\frac{x_1 x_2}{x_2 + 1} - u x_2 + s_{in} u$$

$$y = x_1$$

6.3.3.1.2 Step 2—System Transformation

The objective is to regulate the biomass concentration $x_1$ with the dilution rate u. From the state equations given above the control variable can be found in the first derivative of the output. Therefore state transformation is not required.

6.3.3.1.3 Step 3—Objective Function Creation

The objective function J is given below.

$$J = \frac{1}{2}(\dot{x}_1 + ax_1 - bv)^2$$

$$J = \frac{1}{2}\left(\frac{x_1 x_2}{x_2 + 1} - u x_1 + ax_1 - bv\right)^2$$

6.3.3.1.4 Step 4—Objective Function Minimization

The differential of the function $$\frac{\partial J}{\partial u}$$

is derived.

$$\frac{\partial J}{\partial u} = -x_1(\dot{x}_1 + ax_1 - bv)$$

The control derivative therefore becomes $$\dot{u} = -\lambda \frac{\partial J}{\partial u}$$
$$\dot{u} = \lambda x_1(\dot{x}_1 + ax_1 - bv)$$

The entire system dynamics therefore become $$\dot{x}_1 = \frac{x_1 x_2}{x_2 + 1} - ux_1$$
$$\dot{x}_2 = -\frac{x_1 x_2}{x_2 + 1} - ux_2 + s_{in}u$$
$$\dot{u} = \lambda x_1(\dot{x}_1 + ax_1 - bv)$$
$$y = x_1$$

6.3.3.1.5 Step 5—System Parameter Selection

Further information on the system parameter selection can be found in 7.4.

$$\dot{u}_{min} < \lambda x_1(\dot{x}_1 + ax_1 - bv) < \dot{u}_{max}$$

$$\dot{x}_{1_{min}} < -ax_1 + bv < \dot{x}_{1_{max}}$$

6.3.3.1.5.1 Lambda Selection

| Parameter | Description | Value |
|---|---|---|
| $c_u$ | Minimum magnitude of either $\dot{u}_{min}$ or $\dot{u}_{max}$ | 7 |
| $c_b$ | Maximum magnitude of either $x_{min}$ or $x_{max}$ | 0.7 |
| $c_y$ | Minimum magnitude of either $\dot{x}_{min}$ or $\dot{x}_{max}$ | 0.1 |
| $\lambda$ | $\lambda = \frac{c_u}{c_b(2c_y)}$ | 100 |

6.3.3.1.5.2 Coefficient Selection

| Parameter | Description | Value |
|---|---|---|
| $c_x$ | Maximum magnitude of either $x_{1_{min}}$ or $x_{1_{max}}$ | 0.7 |
| $c_y$ | Minimum magnitude of either $\dot{x}_{1_{min}}$ or $\dot{x}_{1_{max}}$ | 0.1 |
| a | $\frac{c_y}{2c_x} > a$ | 0 < a < 0.0714 |
| b | Gain Parameter | b = a |

6.3.3.2 Results

To illustrate the benefits of the exemplary control system, a test of the system response is illustrated against target response characteristics. In particular, in this example, it is desired that the output of the bioreactor reflect a system with the following dynamics where b=0.02 and a=0.02. The system therefore has a time constant of $$\tau = \frac{1}{0.02} = 50$$

seconds. Therefore for a step input with a magnitude change of 1, the output will change by approximately 63% after 50 seconds has passed. Since b has a value of 0.02, the gain of the input-output is 1.

$$\dot{x}_1 = -ax_1 + bv$$

For this model the test of the control system has been performed for two cases where the system is expected to replicate the behavior of the reference model given above and another scenario where the system performs tracking of a reference signal.

6.3.3.2.1 Model Reference Adaptive Control

The table below presents the input values for the model reference system.

TABLE 6-6

Bioreactor Model Reference Input Table

| Input v | Time (min) |
|---|---|
| 0.2 | 0 ≤ t < 1000 |
| 0.3 + 1(cos(t/25)) | 1000 ≤ t < 2000 |
| 0.45 | 2000 ≤ t < 3000 |
| 0.4 | 3000 ≤ t < 4000 |
| 0.25 | t ≥ 4000 |

6.3.3.2.1.1 Model Output Signal

Figure 9A:
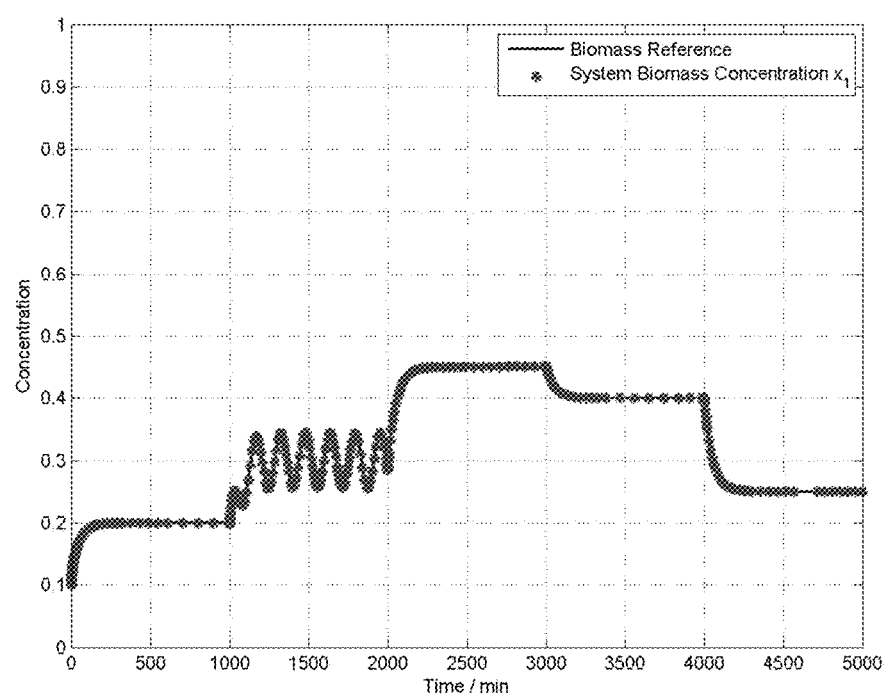
FIG. 9A is a graph illustrating the Bioreactor System Output for model reference adaptive control in accordance with at least one embodiment disclosed herein.
Figure 9B:
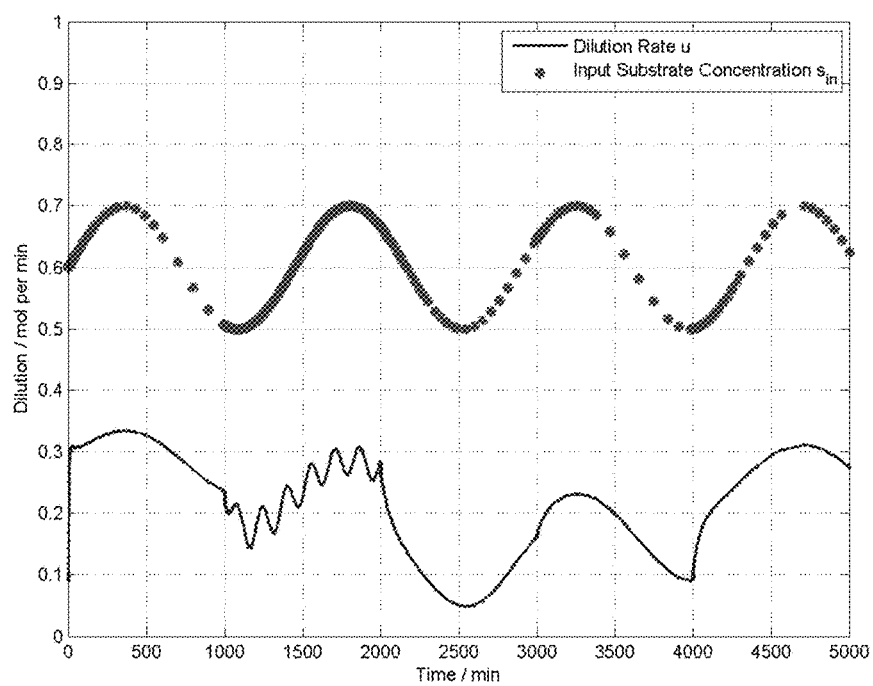
FIG. 9B is a graph illustrating the Bioreactor System Inputs for model reference adaptive control in accordance with at least one embodiment disclosed herein.
Figure 9C:
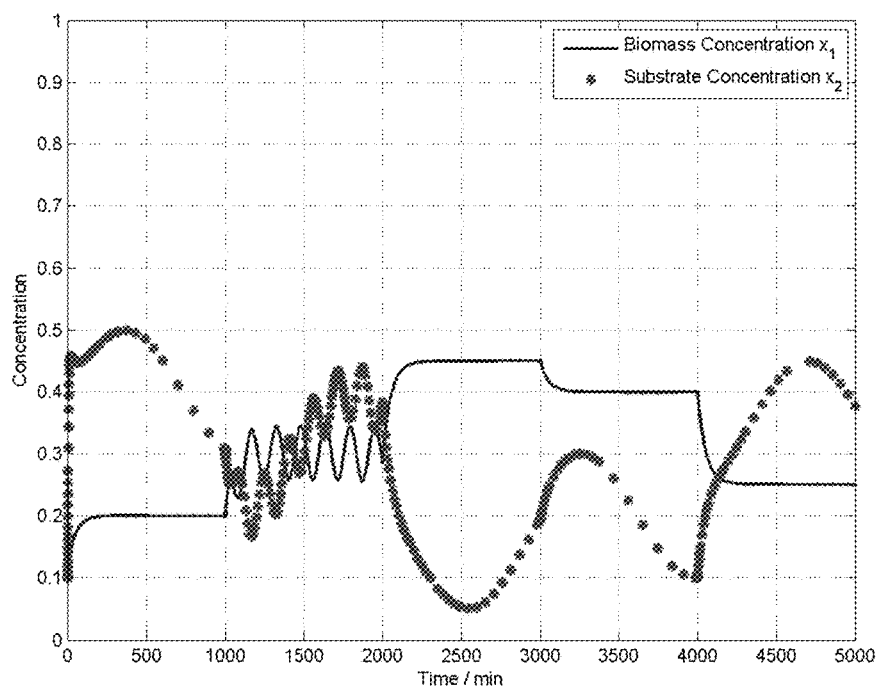
FIG. 9C is a graph illustrating the Bioreactor System States for model reference adaptive control in accordance with at least one embodiment disclosed herein.

FIG. 9A is a graph illustrating the Bioreactor System Output for model reference adaptive control in accordance with at least one embodiment disclosed herein. The diagram above shows that the systems biomass concentration is similar to the reference model. FIG. 9B is a graph illustrating Bioreactor System Inputs for model reference adaptive control in accordance with at least one embodiment disclosed herein. FIG. 9C is a graph illustrating the Bioreactor System States for model reference adaptive control in accordance with at least one embodiment disclosed herein.

6.3.3.2.2 Adaptive Reference Tracking

The table below presents the values of the reference signal which needs to be tracked. The modification to the control system can be made by allowing the new input variable $v=1/b(ay+\dot{r}-k_c(y-r))$, where r is the reference signal and $\dot{r}$ is the derivative of the reference signal.

TABLE 6-7

Bioreactor Reference Tracking Input Table

| Reference r | Time (min) |
|---|---|
| 0.2 | 0 ≤ t < 1000 |
| 0.3 + 1(cos(t/25)) | 1000 ≤ t < 2000 |
| 0.45 | 2000 ≤ t < 3000 |
| 0.4 | 3000 ≤ t < 4000 |
| 0.25 | t ≥ 4000 |

6.3.3.2.2.1 Model Output

Figure 9D:
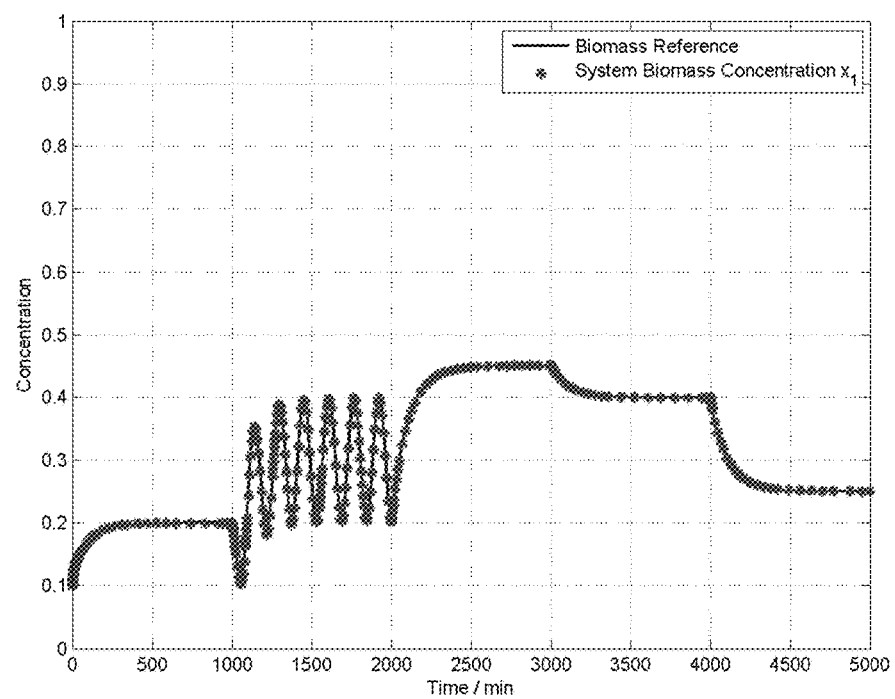
FIG. 9D is a graph illustrating the Bioreactor System Output for reference tracking control in accordance with at least one embodiment disclosed herein.

FIG. 9D is a graph illustrating the Bioreactor System Output for reference tracking control in accordance with at least one embodiment disclosed herein. Comparing the output of this system to that of the reference model, it should be noted that the output tracks the reference value and responds with the desired response time.

6.3.3.2.2.2 Bioreactor Inputs

Figure 9E:
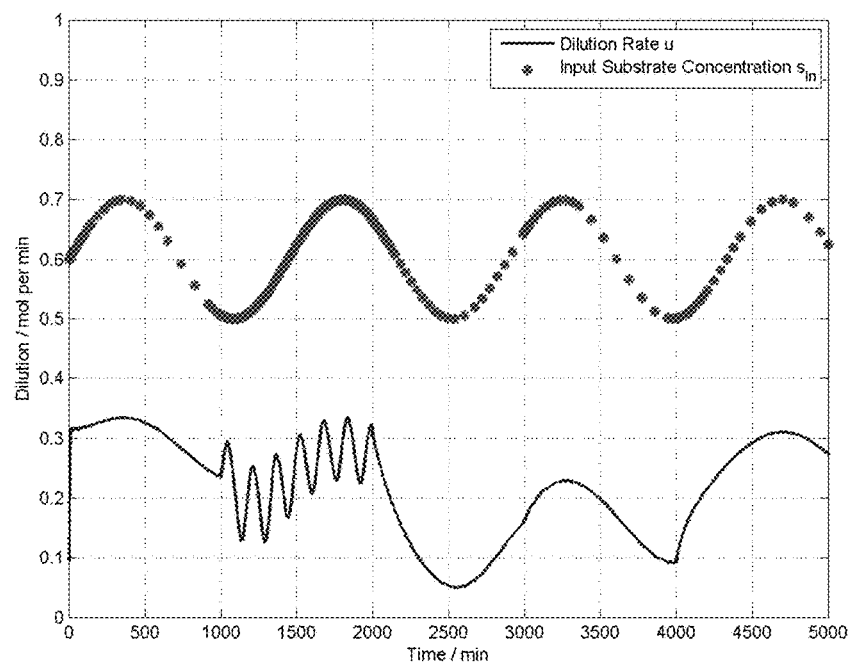
FIG. 9E is a graph illustrating the Bioreactor System Inputs for reference tracking control in accordance with at least one embodiment disclosed herein.

FIG. 9E is a graph illustrating the Bioreactor System Inputs for reference tracking control in accordance with at least one embodiment disclosed herein.

6.3.3.2.2.3 Bioreactor System Concentrations

Figure 9F:
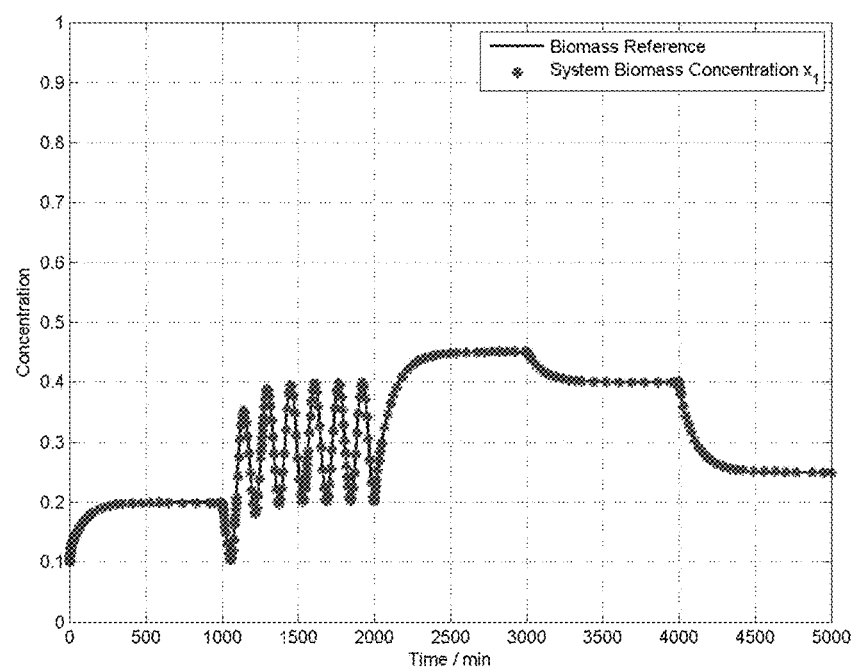
FIG. 9F is a graph illustrating the Bioreactor System States for reference tracking control in accordance with at least one embodiment disclosed herein.

FIG. 9F is a graph illustrating the Bioreactor System States for reference tracking control in accordance with at least one embodiment disclosed herein.

6.3.3.2.3 Comments

The simulation of the bioreactor system was performed for model adaptive reference control and adaptive reference tracking control with a variation of the substrate input $s_{in}$. The graphs for the model reference system show that the controller is able to reject the variations of the caused by $s_{in}$. This observation is also shown for the case of the adaptive reference tracking system.

Comparing the outputs for both control systems in the model output section of the results, it has been shown that the adaptive reference tracking controller more closely follows the input signal. The model adaptive reference control purpose is to replicate the response of a reference system.

6.4 Binary Distillation Column

6.4.1 Description

Figure 10:
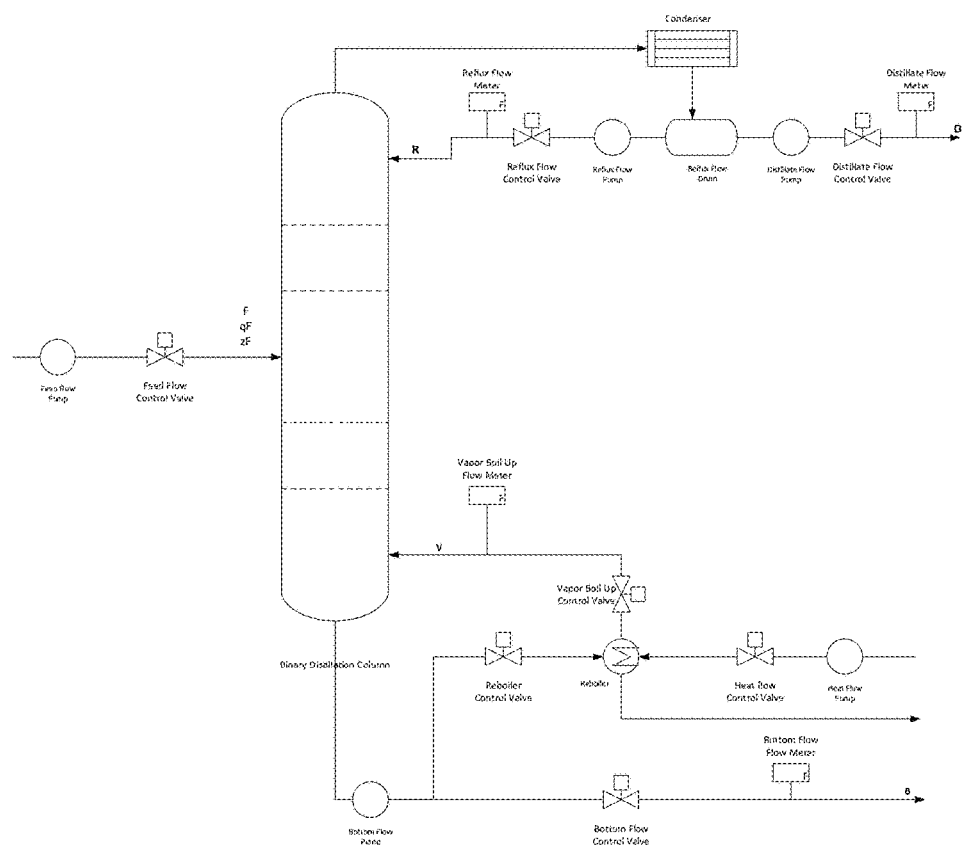
FIG. 10 is a high level piping and instrumentation diagram illustrating an exemplary Distillation Column controlled in accordance with one or more of the disclosed embodiments.

Industrial distillation columns are one of the most recognized components in the process industry. FIG. 10 is a high level piping and instrumentation diagram illustrating an exemplary Distillation Column P&ID controlled in accordance with one or more of the disclosed embodiments and is further described herein. The process of distillation plays a crucial role in satisfying the world's energy needs with regards to the refining of crude oil. Other applications for this system include the distillation of ethanol for the fermentation industry and liquid air separation to produce argon for incandescent light bulbs. This process system can be separated into different types of distillation such as fractional, reactive and vacuum. A binary distillation column is considered the simplest of these wide range of columns and is used as the basis of understanding the behavior of other columns. Following are equations representing the operation of the exemplary Distillation Column.

$$\frac{d(M_i x_i)}{dt} = L_2 x_2 - B x_1 - V y_1 \quad i = 1 \text{ (Reboiler)}$$

$$\frac{d(M_n x_n)}{dt} = V_{n-1} y_{n-1} - R x_n - D x_n \quad i = n \text{ (Condenser)}$$

$$\frac{d(M_f x_f)}{dt} = V_{f-1} y_{f-1} - V_f y_f + L_{f+1} x_{f+1} - L_f x_f + F z_f \quad i = f \text{ (Feed Tray)}$$

$$\frac{d(M_i x_i)}{dt} = V_{i-1} y_{i-1} - V_i y_i + L_{i+1} x_{i+1} - L_i x_i \quad \text{(Other Trays)}$$

Tray compositions dynamic equations $$\frac{d(M_i)}{dt} = L_2 - B - V \quad i = 1 \text{ (Reboiler)}$$

$$\frac{d(M_n)}{dt} = V_{n-1} - R - D \quad i = n \text{ (Condenser)}$$

$$\frac{d(M_f)}{dt} = V_{f-1} - V_f + L_{f+1} - L_f + F \quad i = f \text{ (Feed Tray)}$$

$$\frac{d(M_i)}{dt} = V_{i-1} - V_i + L_{i+1} - L_i \quad \text{(Other Trays)}$$

Tray level dynamic equations $$y_i = \frac{\alpha x_i}{1 + (\alpha - 1) x_i} \quad 1 \le i < n$$

Vapor-liquid equilibria $$L_i =$$

Liquid Flows $$V_i = \begin{matrix} V & 1 \le i < f \\ V + (1 - qF)F & f \le i \le n - 1 \end{matrix}$$

Vapor Flows

| Variable | Description |
| --- | --- |
| R | Reflux Flow Rate |
| V | Vapor Boil Up |
| D | Distillate Product Flow Rate |
| B | Bottom Product Flow Rate |
| F | Feed Flow Rate |
| zF | Feed Composition |
| qF | Feed Liquid Fraction |
| $\alpha$ | Relative Volatility |
| $M_{0_i}$ | Nominal reboiler hold up for the $i^{th}$ tray |
| $\tau$ | Time constant for liquid dynamics |
| $F_0$ | Nominal feed rate |
| $qF_0$ | Nominal fraction of liquid in feed |
| $L_0$ | Nominal reflux flow |
| $L_{0_b}$ | Nominal liquid flow below feed |
| $\lambda$ | Effect of vapor flow on liquid flow ("K2-effect") |
| $V_0$ | Nominal vapor flow |
| $V_{0_t}$ | Nominal vapor flows above the feed stage |
| $M_i$ | Liquid hold up in the $i^{th}$ tray |
| $x_i$ | Liquid composition up in the $i^{th}$ tray |
| $L_i$ | Liquid flow for the $i^{th}$ tray |
| $V_i$ | Vapor flow for the $i^{th}$ tray |

6.4.2 Exemplary Instrument Requirements

The instruments that are generally associated with a binary distillation column, for example, are presented below.

Feed Flow Meter
  The flow meter measures the input flow rate into the binary column. In industrial environments, this instrument interfaces with the PLC through a 4-20 mA analog signal.

Feed Flow Pump
  The feed flow pump provides the liquid to be separated to the column. The pump drive will accept speed settings from the PLC in the form of a 4-20 mA analog signal.

Feed Flow Control Valve
  The feed flow control valve controls the flow into the column. The valve is controlled by digital 0-24 V signals which would either close or open the valve.

Distillate Flow Meter
  The flow meter measures the output flow rate out of the binary column. In industrial environments, this instrument interfaces with the PLC through a 4-20 mA analog signal.

Distillate Flow Pump
  The distillate flow pump removes the liquid at the top of the column. The pump drive will accept speed settings from the PLC in the form of a 4-20 mA analog signal.

Distillate Flow Control Valve
  The feed flow control valve controls the flow of the distillate from the column. The valve is controlled by digital 0-24 V signals which would either close or open the valve.

Reflux Flow meter
The flow meter measures the distillate return flow rate out to the binary column. In industrial environments, this instrument interfaces with the PLC through a 4-20 mA analog signal.

Reflux Flow Pump
The reflux flow pump returns the liquid at the top of the column. The pump drive will accept speed settings from the PLC in the form of a 4-20 mA analog signal.

Reflux Flow Control Valve
The reflux flow control valve controls the return flow of the distillate to the column. The valve is controlled by digital 0-24 V signals which would either close or open the valve.

Vapor Boil Up Flow Meter
The vapor boil up flow meter measures the flow rate of the heated material to the bottom of the binary column. In industrial environments, this instrument interfaces with the PLC through a 4-20 mA analog signal.

Heat Flow Pump
The heat flow pump transfers steam to the reboiler to heat the liquid collected at the bottom of the column. The pump drive will accept speed settings from the PLC in the form of a 4-20 mA analog signal.

Vapor Boil Up Flow Control Valve
The heat flow control valve controls the vapor flow to the bottom of the column. The valve is controlled by digital 0-24 V signals which would either close or open the valve.

Heat Flow Control Valve
The heat flow control valve controls the heat to the reboiler. The valve is controlled by digital 0-24 V signals which would either close or open the valve.

Bottom Flow Control Valve
The bottom control flow control valve controls the liquid flow from the bottom of the column. The valve is controlled by digital 0-24 V signals which would either close or open the valve.

Reboiler Flow Control Valve
The reboiler flow control valve controls the flow of liquid to the reboiler. The valve is controlled by digital 0-24 V signals which would either close or open the valve.

Reboiler Flow Pump
The reboiler flow pump transfers liquid from the bottom of the column. The pump drive will accept speed settings from the PLC in the form of a 4-20 mA analog signal.

Distillate Concentration Sensor
The concentration sensor provides the percentage of the components of the liquid being sampled. The concentration measurement is provided to the PLC in the form of a 4-20 mA analog signal.

Bottom Concentration Sensor
The concentration sensor provides the percentage of the components of the liquid being sampled. The concentration measurement is provided to the PLC in the form of a 4-20 mA analog signal.

6.4.3 Simulation
6.4.3.1 Control Development
6.4.3.1.1 Step 1—Model Identification Due to the large number of equations that are shown in the description, only the relevant equations are shown below.

$$\dot{x}_1 = \frac{L_2 x_2 - B x_1 - V y_1}{M_1}$$

-continued $$\dot{x}_{41} = \frac{V_{40} y_{40} - R x_{41} - D x_{41}}{M_{41}}$$

$$\dot{M}_1 = L_2 - B - V$$

$$\dot{M}_{41} = V_{40} - R - D$$

$$Y = [\, x_1 \quad x_{41} \quad M_1 \quad M_{41} \,]'$$

6.4.3.1.2 Step 2—System Transformation

In this particular, example, the objective is to regulate the compositions of the bottom ($x_1$) and the distillate ($x_{41}$) along with the liquid levels of the bottom ($M_1$) and the distillate ($M_{41}$). The table shown in this section identifies the control variable which is assigned to the process variable. The first derivative of any of the outputs provides a control variable which can be used to regulate the process variable. Therefore state transformation is not required.

TABLE 8

Binary distillation column control variable to process variable mapping

| Controlled Variable (Inputs) | Process Variable (Outputs) |
| --- | --- |
| D | $x_{41}$ |
| V | $x_1$ |
| R | $M_{41}$ |
| B | $M_1$ |

6.4.3.1.3 Step 3—Objective Function Creation
6.4.3.1.3.1 Distillation Composition Objective Function The objective function $J_{x_{41}}$ is given below.

$$J_{x_{41}} = \frac{1}{2}(\dot{x}_{41} + a_{x_{41}} x_{41} - b_{x_{41}} v_{x_{41}})^2$$

$$J_{x_{41}} = \frac{1}{2}\left(\frac{V_{40} y_{40} - R x_{41} - D x_{41}}{M_{41}} + a_{x_{41}} x_{41} - b_{x_{41}} v_{x_{41}}\right)^2$$

6.4.3.1.3.2 Bottom Composition Objective Function

The objective function $J_{x_1}$ is given below.

$$J_{x_1} = \frac{1}{2}(\dot{x}_1 + a_{x_1} x_1 - b_{x_1} v_{x_1})^2$$

$$J_{x_1} = \frac{1}{2}\left(\frac{L_2 x_2 - B x_1 - V y_1}{M_1} + a_{x_1} x_1 - b_{x_1} v_{x_1}\right)^2$$

6.4.3.1.3.3 Distillation Level Objective Function

The objective function $J_{M_{41}}$ is given below.

$$J_{M_{41}} = \frac{1}{2}(\dot{M}_{41} + a_{M_{41}} M_{41} - b_{M_{41}} v_{M_{41}})^2$$

$$J_{M_{41}} = \frac{1}{2}(V_{40} - R - D + a_{M_{41}} M_{41} - b_{M_{41}} v_{M_{41}})^2$$

6.4.3.1.3.4 Bottom Level Composition Objective Function

The objective function $J_{M_1}$ is given below.

$$J_{M_1} = \frac{1}{2}(\dot{M}_1 + a_{M_1} M_1 - b_{M_1} v_{M_1})^2$$

$$J_{M_1} = \frac{1}{2}(L_2 x_2 - B x_1 - V y_1 + a_{M_1} M_1 - b_{M_1} v_{M_1})^2$$

6.4.3.1.4 Step 4—Objective Function Minimization
6.4.3.1.4.1 Distillation Composition Objective Function The objective function $J_{x_{41}}$ is minimized below.

$$\frac{\partial J_{x_{41}}}{\partial D} = -\frac{x_{41}}{M_{41}}(\dot{x}_{41} + a_{x_{41}}x_{41} - b_{x_{41}}v_{x_{41}})$$

$$\dot{D} = -\lambda \frac{\partial J_{x_{41}}}{\partial D}$$

$$\dot{D} = \lambda \frac{x_{41}}{M_{41}}(\dot{x}_{41} + a_{x_{41}}x_{41} - b_{x_{41}}v_{x_{41}})$$

6.4.3.1.4.2 Bottom Composition Objective Function

The objective function $J_{x_1}$ is minimized below.

$$\frac{\partial J_{x_1}}{\partial V} = -\frac{y_1}{M_1}(\dot{x}_1 + a_{x_1}x_1 - b_{x_1}v_{x_1})$$

$$\dot{V} = -\lambda_{x_1}\frac{J_{x_1}}{\partial V}$$

$$\dot{V} = \lambda_{x_1}\frac{y_1}{M_1}(\dot{x}_1 + a_{x_1}x_1 - b_{x_1}v_{x_1})$$

6.4.3.1.4.3 Distillation Level Objective Function

The objective function $J_{M_{41}}$ is minimized below.

$$\frac{\partial J_{M_{41}}}{\partial R} = -(\dot{M}_{41} + a_{M_{41}}M_{41} - b_{M_{41}}v_{M_{41}})$$

$$\dot{R} = -\lambda_{M_{41}}\frac{\partial J_{M_{41}}}{\partial R}$$

$$\dot{R} = \lambda_{M_{41}}(\dot{M}_{41} + a_{M_{41}}M_{41} - b_{M_{41}}v_{M_{41}})$$

6.4.3.1.4.4 Bottom Level Composition Objective Function

The objective function $J_{M_1}$ is minimized below.

$$\frac{\partial J_{M_1}}{\partial B} = -(\dot{M}_1 + a_{M_1}M_1 - b_{M_1}v_{M_1})$$

$$\dot{B} = -\lambda_{M_1}\frac{\partial J_{M_1}}{\partial B}$$

$$\dot{B} = \lambda_{M_1}(\dot{M}_1 + a_{M_1}M_1 - b_{M_1}v_{M_1})$$

6.4.3.1.5 Step 5—System Parameter Selection

Further information on the system parameter selection can be found in 7.4.

Only the one parameter selection procedure is performed. The procedure can be repeated to obtain the parameters for the other system outputs.

6.4.3.1.5.1 Composition $x_{41}$ Parameter Selection $$\dot{D}_{min} < \lambda_{x_{41}}x_{41}(\dot{x}_{41} + a_{41}x_{41} - b_{41}v_{41}) < \dot{D}_{max}$$

$$\dot{x}_{41_{min}} < -a_{41}x_{41} + b_{41}v_{41} < \dot{x}_{41_{max}}$$

6.4.3.1.5.1.1 Lambda Selection

| Parameter | Description | Value |
|---|---|---|
| $c_u$ | Minimum magnitude of either $\dot{D}_{min}$ or $\dot{D}_{max}$ | 10 |
| $c_b$ | Maximum magnitude of either $y_{41_{min}}$ or $y_{41_{max}}$ | 1 |
| $c_y$ | Minimum magnitude of either $\dot{x}_{41_{min}}$ or $\dot{x}_{41_{max}}$ | 0.05 |

| Parameter | Description | Value |
|---|---|---|
| $\lambda_{x_{41}}$ | $\lambda = \dfrac{c_u}{c_b(2c_y)}$ | 100 |

6.4.3.1.5.1.2 Coefficient Selection

| Parameter | Description | Value |
|---|---|---|
| $c_x$ | Maximum magnitude of either $x_{41_{min}}$ or $x_{41_{max}}$ | 1 |
| $c_y$ | Minimum magnitude of either $\dot{x}_{41_{min}}$ or $\dot{x}_{41_{max}}$ | 0.05 |
| a | $\dfrac{c_y}{2c_x} > a$ | $0 < a < 0.025$ |
| b | Gain Parameter | b = a |

6.4.3.2 Results

To illustrate the benefits of the exemplary control system, a test of the system response is illustrated against target response characteristics. In particular, in this example, it is desired that the outputs of the distillation column reflect a systems with the following dynamics $$\dot{x}_1 = -a_{x_1}x_1 + b_{x_1}v_{x_1}$$

$$\dot{x}_{41} = -a_{x_{41}}x_{41} + b_{x_{41}}v_{x_{41}}$$

$$\dot{M}_1 = -a_{M_1}M_1 + b_{M_1}v_{M_1}$$

$$\dot{M}_{41} = -a_{M_{41}}M_{41} + b_{M_{41}}v_{M_{41}}$$

The parameters are presented in the table below.

| Parameter | Value |
|---|---|
| $a_{x_1}$ | 0.005 |
| $b_{x_1}$ | 0.005 |
| $a_{x_{41}}$ | 0.005 |
| $b_{x_{41}}$ | 0.005 |
| $a_{M_1}$ | 0.05 |
| $b_{M_1}$ | 0.05 |
| $a_{M_{41}}$ | 0.05 |
| $b_{M_{41}}$ | 0.05 |

| State | Time Constant | Gain |
|---|---|---|
| $x_1$ | $\tau_{x_1} = \dfrac{1}{0.005} = 200$ mins | 1 |
| $x_{41}$ | $\tau_{x_{41}} = \dfrac{1}{0.005} = 200$ mins | 1 |
| $M_1$ | $\tau_{M_1} = \dfrac{1}{0.05} = 20$ mins | 1 |
| $M_{41}$ | $\tau_{M_{41}} = \dfrac{1}{0.05} = 20$ mins | 1 |

For this model the test implementation has been performed for two cases where the system is expected to demonstrate model reference behavior and another scenario where the system performs tracking of a reference signal.

6.4.3.2.1 Model Reference Adaptive Control
The table below presents the input values.

TABLE 6-9

Distillation Model Reference Input Table

| Bottom Composition Input $v_{x_1}$ | Distillate Composition Input $v_{x_{41}}$ | Bottom Level Input $v_{M_1}$ | Distillate Level Input $v_{M_{41}}$ | Time (mins) |
|---|---|---|---|---|
| 0.1 | 0.8 | 0.45 | 0.4 | $0 \le t < 2500$ |
| 0.25 | 0.95 | 0.45 | 0.4 | $2500 \le t < 5000$ |
| $0.2 + 0.1\cos(t/80)$ | 0.75 | 0.45 | 0.4 | $5000 \le t < 7500$ |
| 0.05 | $0.85 + 0.05\sin(t/100)$ | 0.45 | 0.4 | $7500 \le t < 10000$ |
| 0.3 | 0.9 | 0.45 | 0.4 | $10000 \le t < 12500$ |
| 0.05 | 0.95 | 0.45 | 0.4 | $12500 \le t < 15000$ |

Figure 11A:
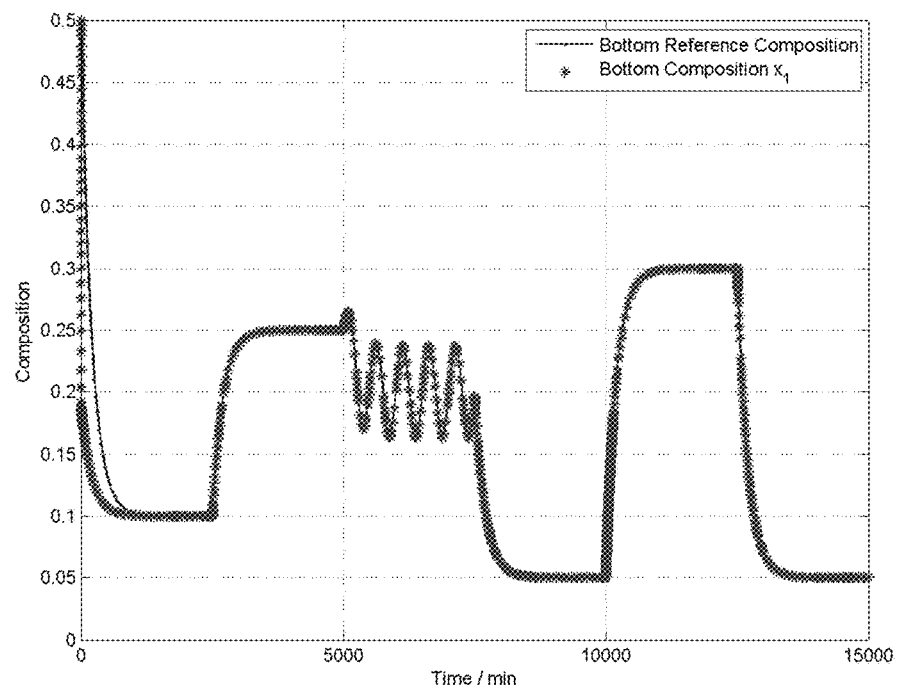
FIG. 11A is a graph depicting the Bottoms Composition System Output for model reference adaptive control in accordance with at least one embodiment disclosed herein.
Figure 11B:
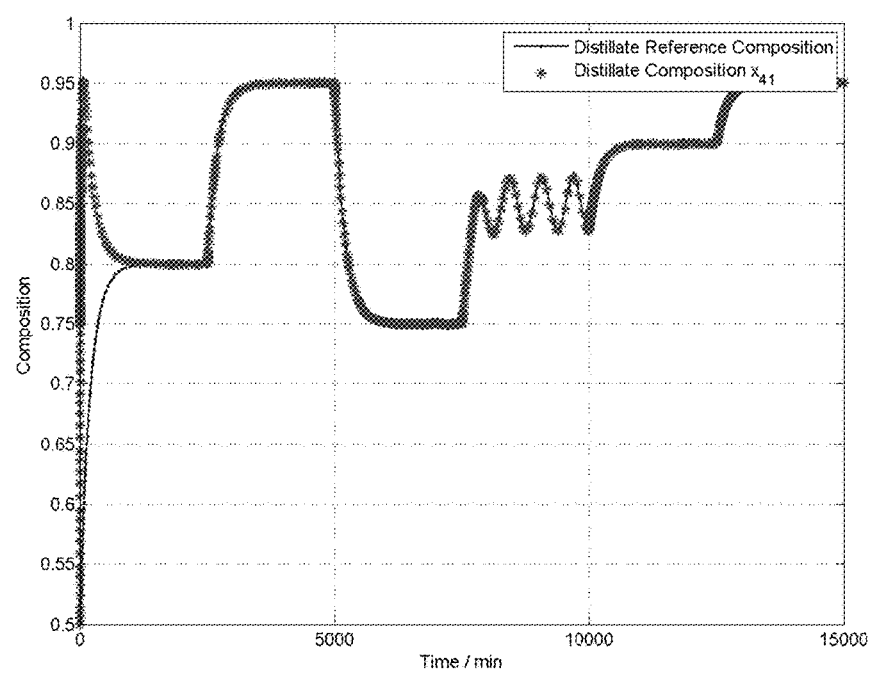
FIG. 11B is a graph illustrating the Distillate Composition System Output for model reference adaptive control in accordance with at least one embodiment disclosed herein.
Figure 11C:
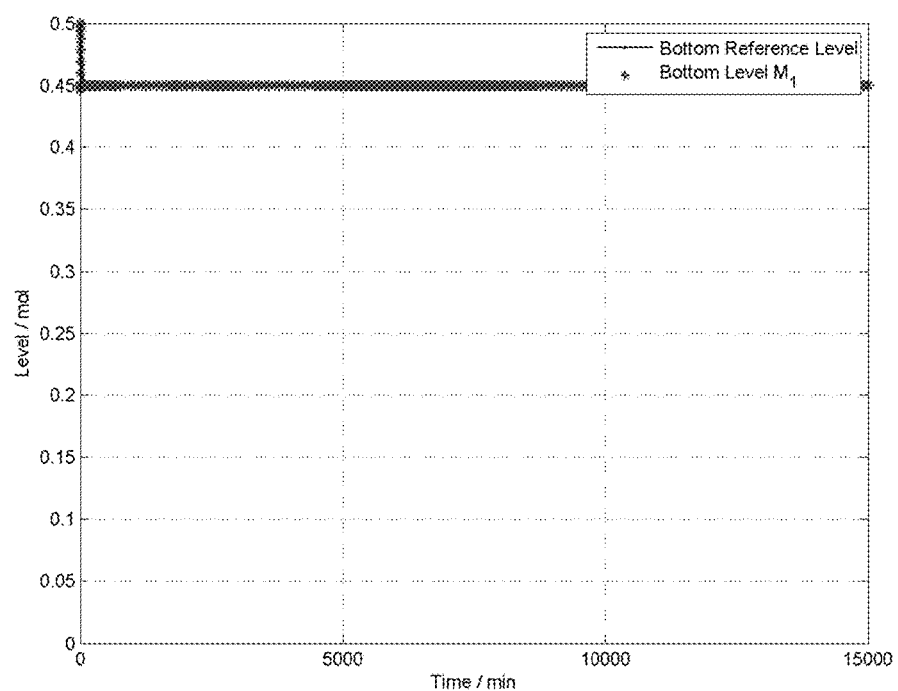
FIG. 11D is a graph illustrating Distillate Level System Output for model reference adaptive control in accordance with at least one embodiment disclosed herein.
FIG. 11E is a graph illustrating Binary Distillation Columns Control Inputs for model reference adaptive control in accordance with at least one embodiment disclosed herein.
FIG. 11F is a graph illustrating Binary Distillation Columns Disturbance Inputs for model reference adaptive control in accordance with at least one embodiment disclosed herein.
FIG. 11G is a graph illustrating Binary Distillation Columns Tray compositions for model reference adaptive control in accordance with at least one embodiment disclosed herein.
FIG. 11H is a graph illustrating Binary Distillation Columns Tray levels for model reference adaptive control in accordance with at least one embodiment disclosed herein.
FIG. 11I is a graph illustrating Bottoms Composition System Output for reference tracking control in accordance with at least one embodiment disclosed herein.
FIG. 11J is a graph illustrating Distillate Composition System Output for reference tracking control in accordance with at least one embodiment disclosed herein.
FIG. 11K is a graph illustrating Bottoms Level System Output for reference tracking control in accordance with at least one embodiment disclosed herein.
FIG. 11L is a graph illustrating Distillate Level System Output for reference tracking control in accordance with at least one embodiment disclosed herein.
FIG. 11M is a graph illustrating Binary Distillation Columns Control Inputs for reference tracking control in accordance with at least one embodiment disclosed herein.
FIG. 11N is a graph illustrating Binary Distillation Columns Disturbance Inputs for reference tracking control in accordance with at least one embodiment disclosed herein.
FIG. 11O is a graph illustrating Binary Distillation Columns Tray compositions for reference tracking control in accordance with at least one embodiment disclosed herein.
FIG. 11P is a graph illustrating Binary Distillation Columns Tray levels for reference tracking control in accordance with at least one embodiment disclosed herein.
Figure 11D:
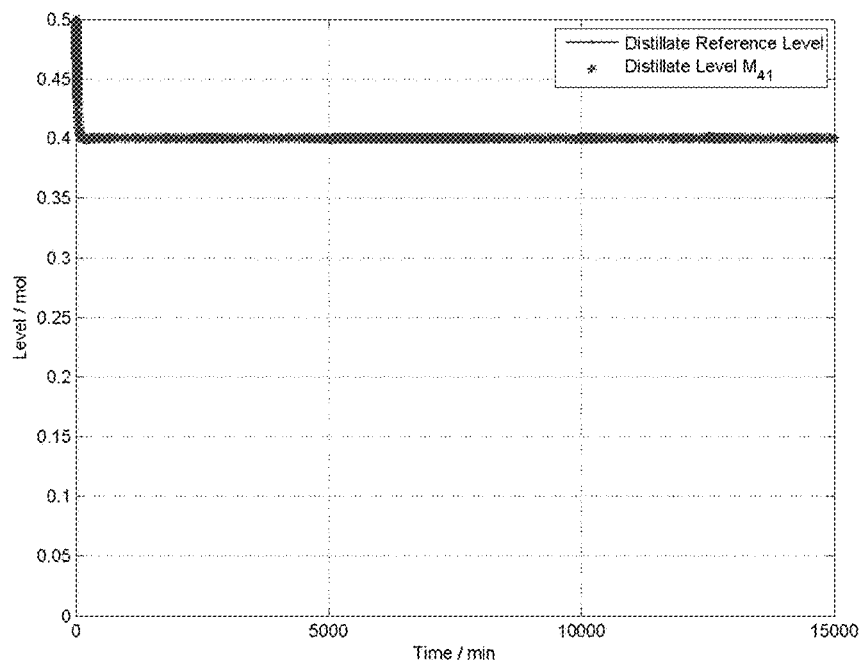
Figure 11E:
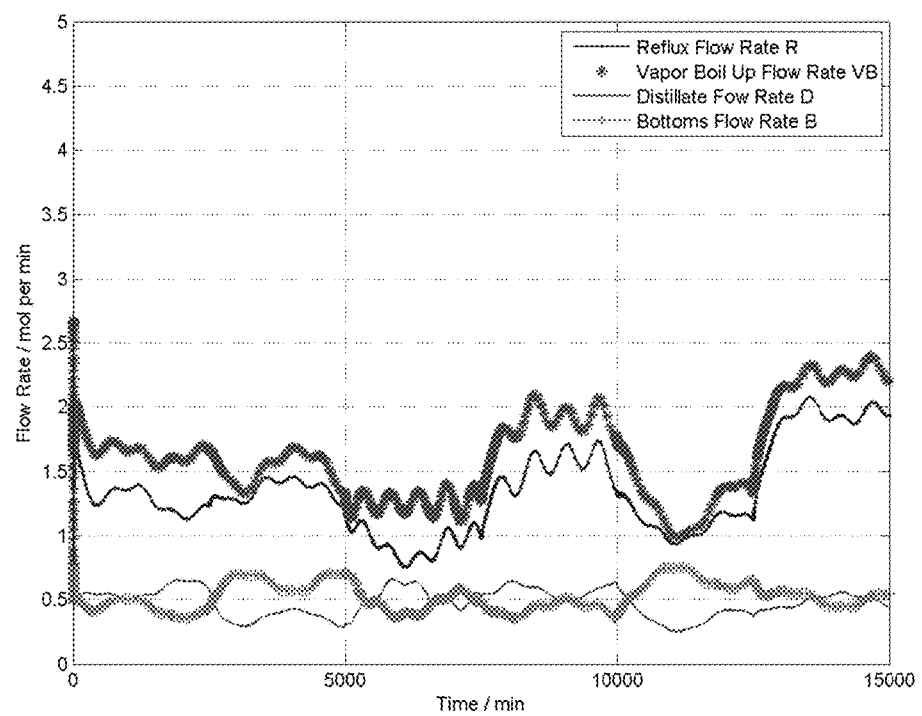
Figure 11F:
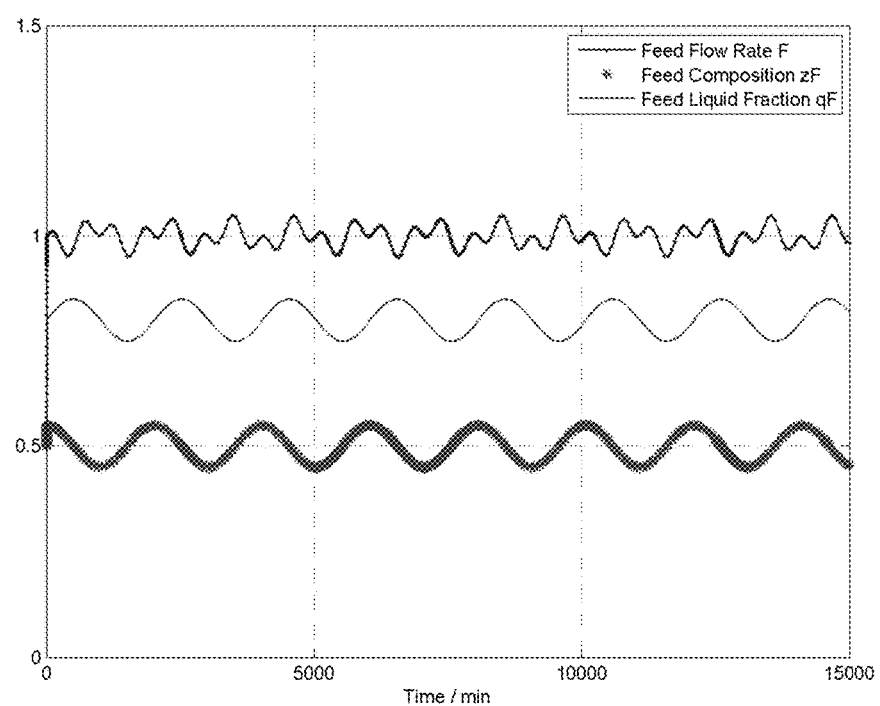
Figure 11G:
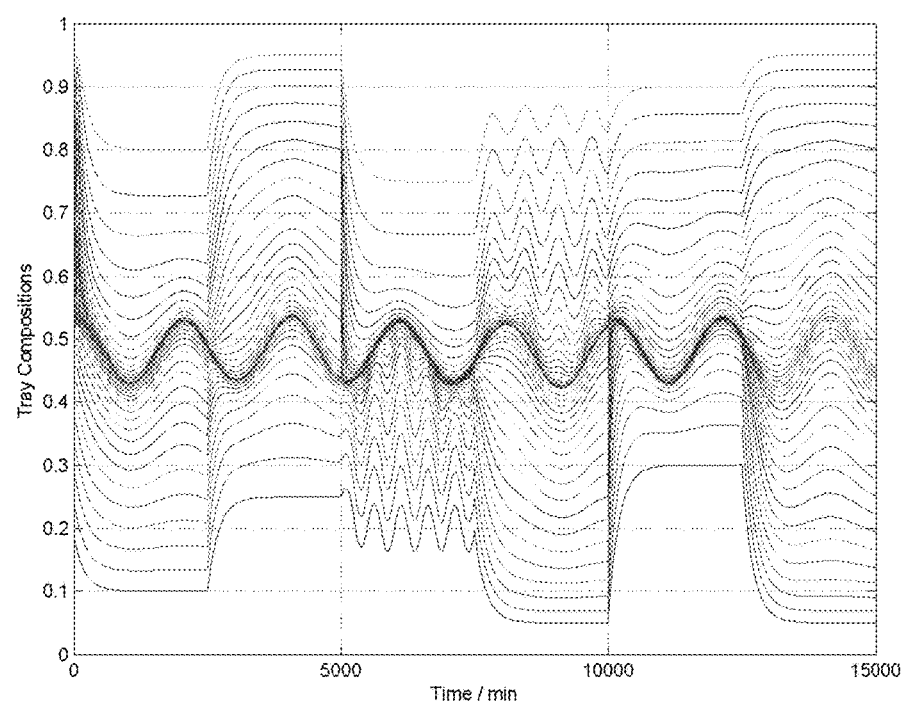
Figure 11H:
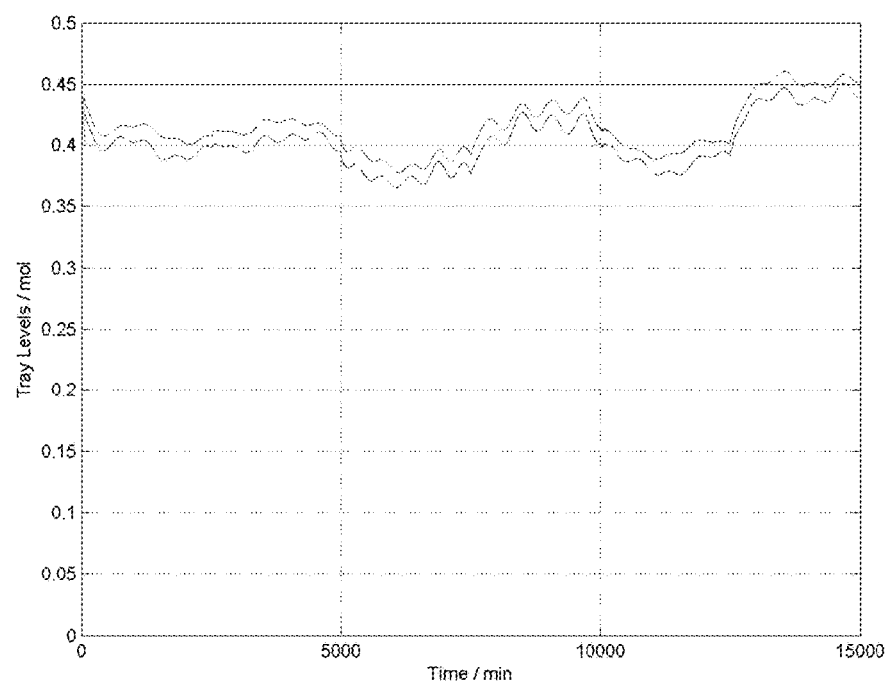

6.4.3.2.1.1 Bottoms Composition System Output
FIG. 11A is a graph depicting the Bottoms Composition System Output for model reference adaptive control in accordance with one or more
6.4.3.2.1.2 Distillate Composition System Output
FIG. 11B is a graph illustrating the Distillate Composition System Output for model reference adaptive control.
6.4.3.2.1.3 Bottoms Level System Output
FIG. 11C is a graph illustrating Bottoms Level System Output for model reference adaptive control in accordance with at least one embodiment disclosed herein.
6.4.3.2.1.4 Distillate Level System Output
FIG. 11D is a graph illustrating Distillate Level System Output for model reference adaptive control in accordance with at least one embodiment disclosed herein.
6.4.3.2.1.5 Control Inputs
FIG. 11E is a graph illustrating Binary Distillation Columns Control Inputs for model reference adaptive control in accordance with at least one embodiment disclosed herein.
6.4.3.2.1.6 Disturbance Inputs
FIG. 11F is a graph illustrating Binary Distillation Columns Disturbance Inputs for model reference adaptive control in accordance with at least one embodiment disclosed herein.
6.4.3.2.1.7 Column Tray Compositions
FIG. 11G is a graph illustrating Binary Distillation Columns Tray compositions for model reference adaptive control in accordance with at least one embodiment disclosed herein.
6.4.3.2.1.8 Column Tray Levels
FIG. 11H is a graph illustrating Binary Distillation Columns Tray levels for model reference adaptive control in accordance with at least one embodiment disclosed herein.
6.4.3.2.2 Adaptive Reference Tracking
The table below presents the reference values for the distillation column.

Figure 11I:
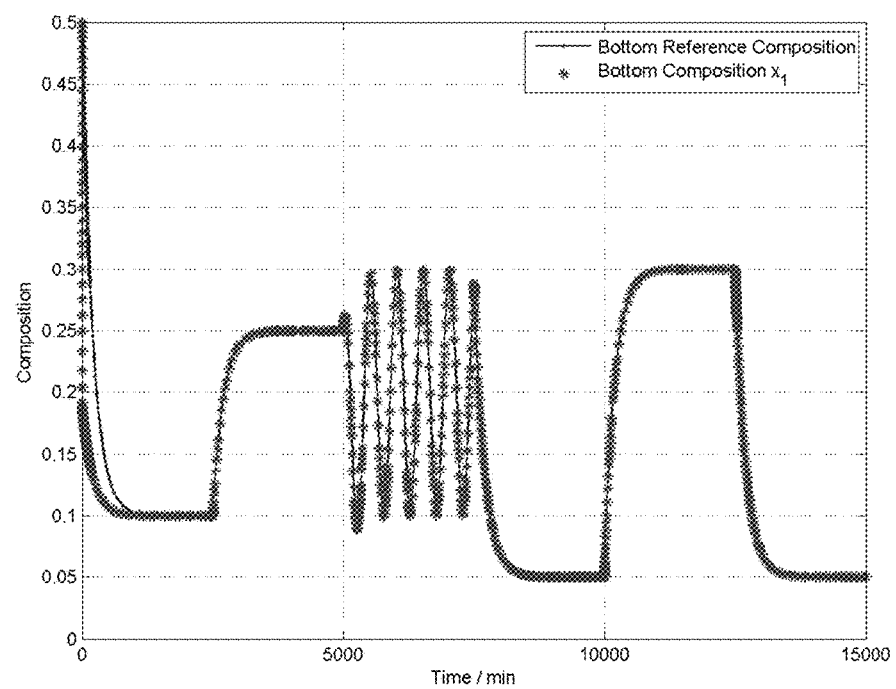
Figure 11J:
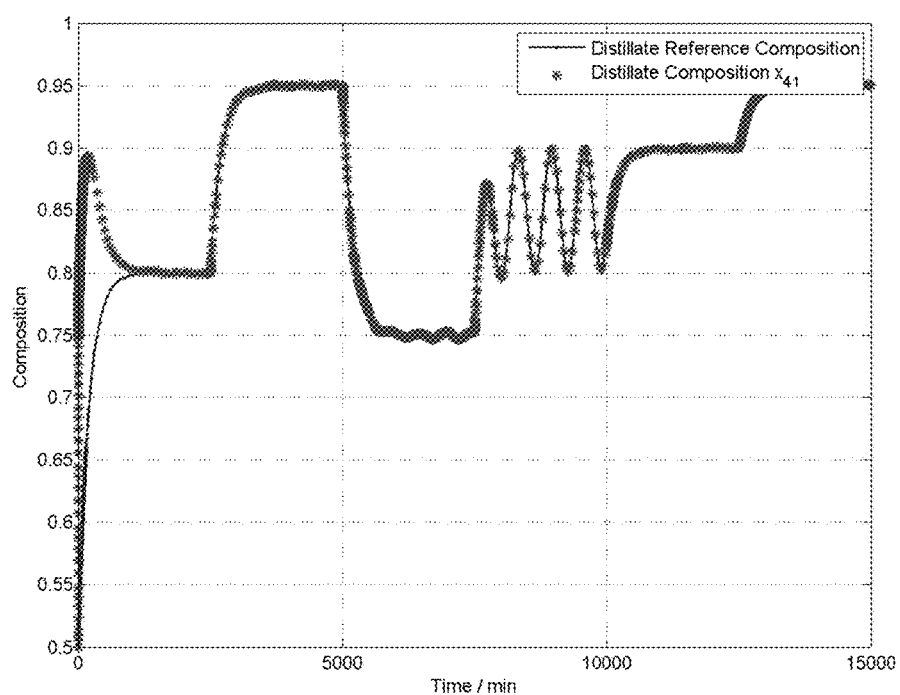
Figure 11K:
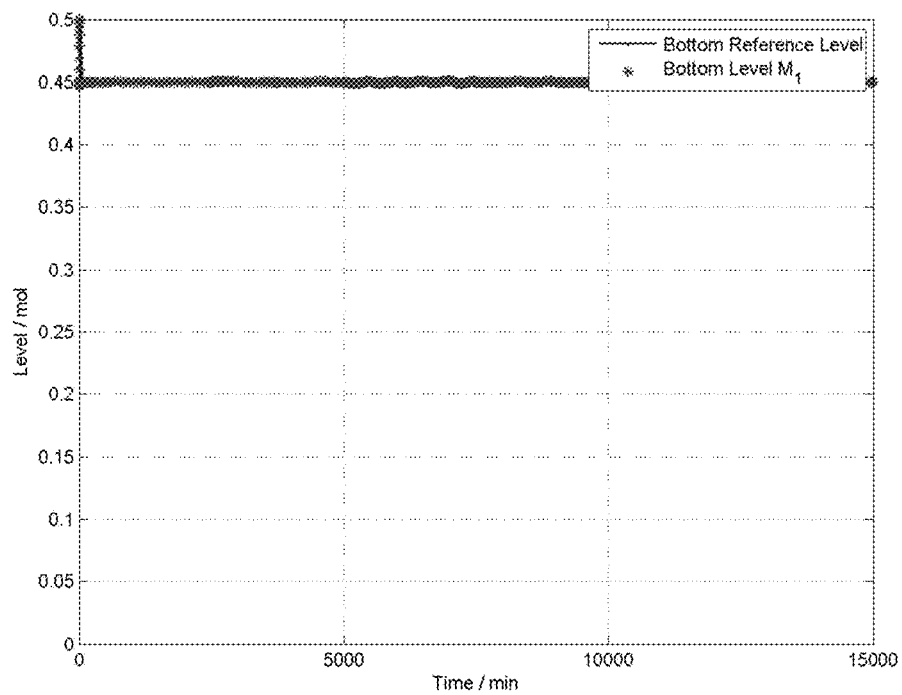
Figure 11L:
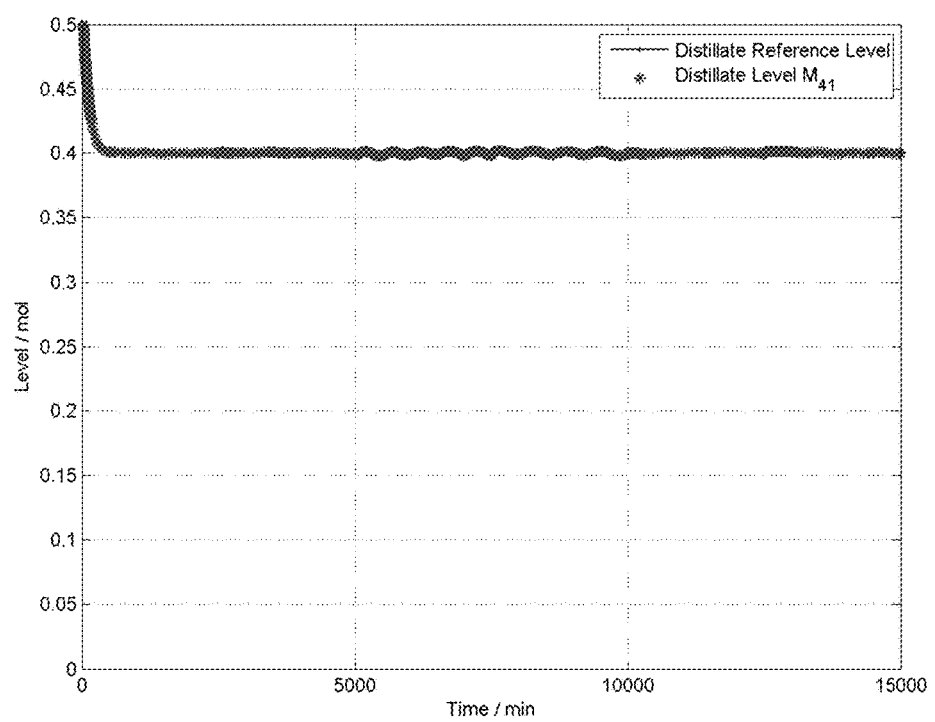
Figure 11M:
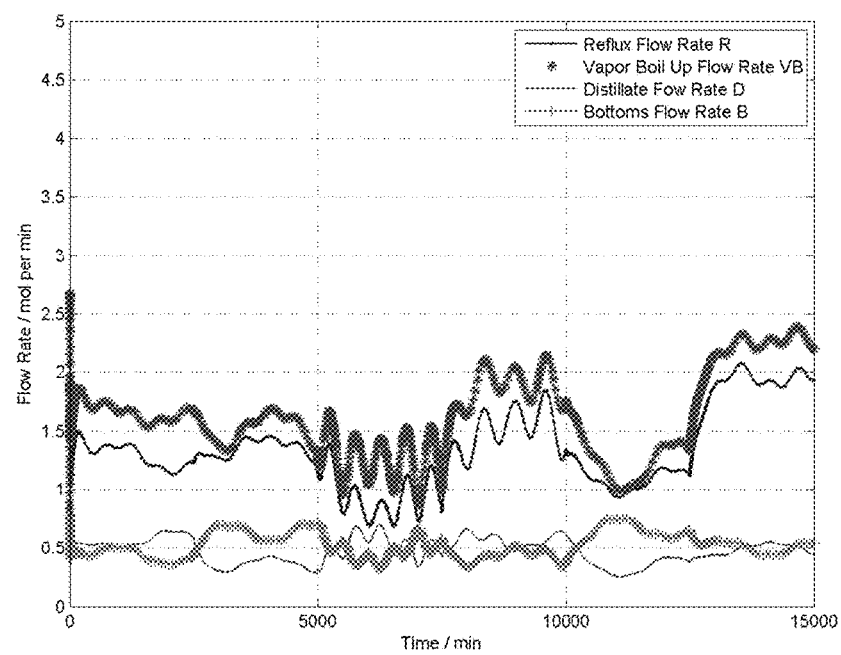
Figure 11N:
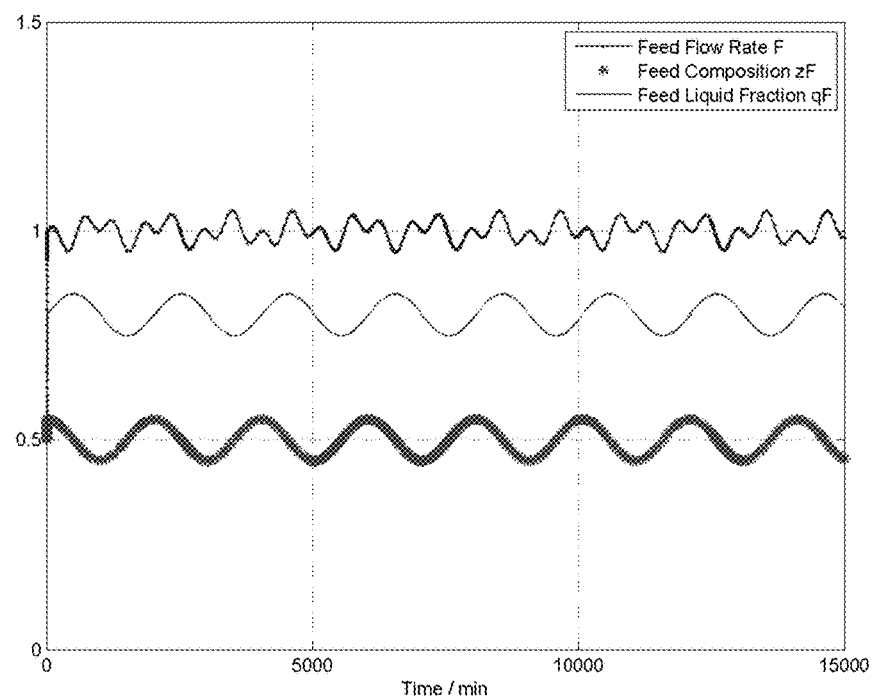
Figure 11O:
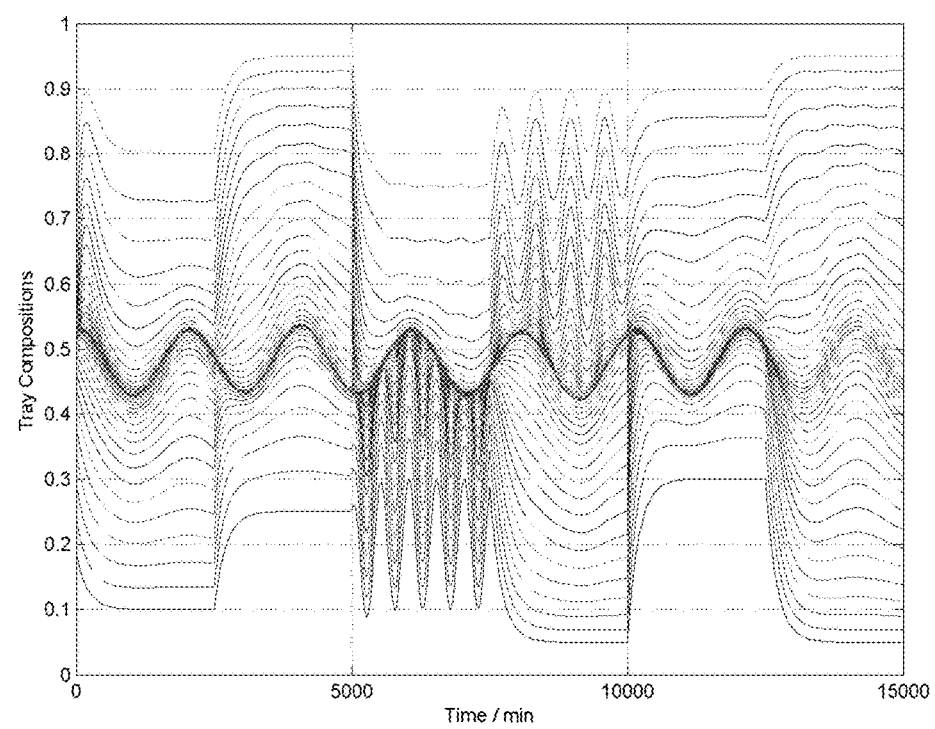
Figure 11P:
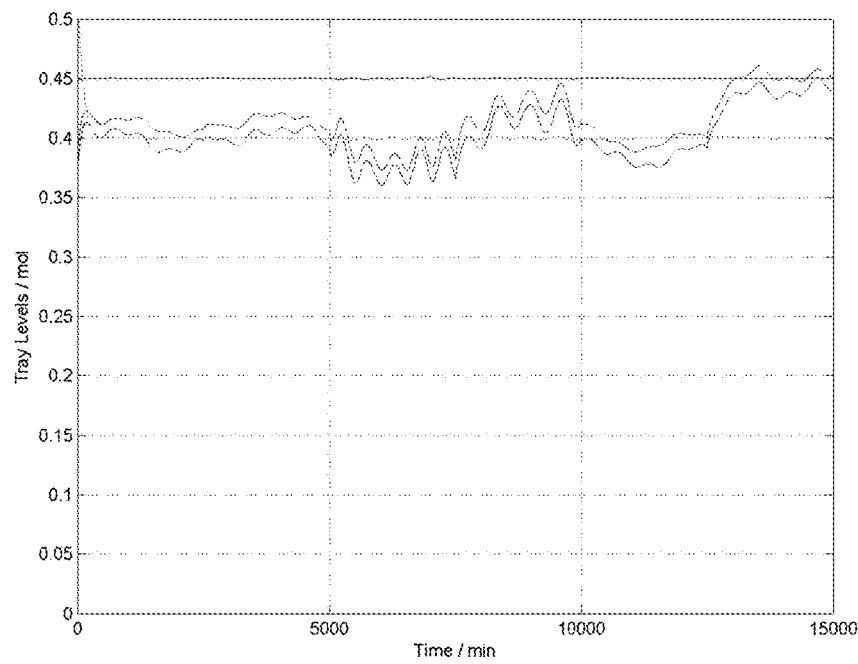

6.4.3.2.2.1 Bottoms Composition System Output
FIG. 11I is a graph illustrating Bottoms Composition System Output for reference tracking control in accordance with at least one embodiment disclosed herein.
6.4.3.2.2.2 Distillate Composition System Output
FIG. 11J is a graph illustrating Distillate Composition System Output for reference tracking control in accordance with at least one embodiment disclosed herein.
6.4.3.2.2.3 Bottoms Level System Output
FIG. 11K is a graph illustrating Bottoms Level System Output for reference tracking control in accordance with at least one embodiment disclosed herein.
6.4.3.2.2.4 Distillate Level System Output
FIG. 11L is a graph illustrating Distillate Level System Output for reference tracking control in accordance with at least one embodiment disclosed herein.
6.4.3.2.2.5 Control Inputs
FIG. 11M is a graph illustrating Binary Distillation Columns Control Inputs for reference tracking control in accordance with at least one embodiment disclosed herein.
6.4.3.2.2.6 Disturbance Inputs
FIG. 11N is a graph illustrating Binary Distillation Columns Disturbance Inputs for reference tracking control in accordance with at least one embodiment disclosed herein.
6.4.3.2.2.7 Column Tray Compositions
FIG. 11O is a graph illustrating Binary Distillation Columns Tray compositions for reference tracking control in accordance with at least one embodiment disclosed herein.
6.4.3.2.2.8 Column Tray Levels
FIG. 11P is a graph illustrating Binary Distillation Columns Tray levels for reference tracking control in accordance with at least one embodiment disclosed herein.
6.4.3.3 Comments
The binary distillation column presented falls under the class of MIMO systems. These systems are generally difficult to control as changes in one output causes a change in the other system outputs. Both model reference adaptive

TABLE 6-10

Distillation Reference Tracking Input Table

| Bottom Composition Reference $r_{x_1}$ | Distillate Composition Reference $r_{x_{41}}$ | Bottom Level Reference $r_{M_1}$ | Distillate Level Reference $r_{M_{41}}$ | Time (mins) |
|---|---|---|---|---|
| 0.1 | 0.8 | 0.45 | 0.4 | $0 \le t < 2500$ |
| 0.25 | 0.95 | 0.45 | 0.4 | $2500 \le t < 5000$ |
| $0.2 + 0.1\cos(t/80)$ | 0.75 | 0.45 | 0.4 | $5000 \le t < 7500$ |
| 0.05 | $0.85 + 0.05\sin(t/100)$ | 0.45 | 0.4 | $7500 \le t < 10000$ |
| 0.3 | 0.9 | 0.45 | 0.4 | $10000 \le t < 12500$ |
| 0.05 | 0.95 | 0.45 | 0.4 | $12500 \le t < 15000$ | control and adaptive reference tracking have been performed on the model for the binary distillation column. The input values were chosen to show that the controlled system can independently perform the control action for which it was designed. To additionally show the benefit of the control algorithm developed, the disturbance inputs are allowed to vary within range of their average values.

In both cases of control, the system required the knowledge of the distillation liquid composition $x_{41}$ and the bottom vapor composition $y_1$ for composition control. The control of the liquid levels only requires the value of the level and its derivative. Both control systems were able to reject the effect caused by the disturbance inputs. The graphs also show that despite the changes in the input and reference values for a given control variable, the other variables did not deviate from their expected values. This is accomplished by the minimization of the objective functions where the variations become present in the derivatives of the outputs. As the aim of the control is to minimize the objective function, the control will therefore perform the required action to compensate for the changes caused by other dynamics of the system.

7 Appendix A 7.1 Model Reference Adaptive Control

The objective of Model Reference Adaptive control is to create a closed loop system for the plant or system to be controlled whose response to an input stimulation is similar to that of a reference model. This is achieved with the aid of an adjustment algorithm being used to modify the controller. In the case which we are exploring, most of the systems are nonlinear and therefore generally present a nonlinear response to any input stimulation. In this case, preferably the controller is modified to force the system to present a linear model. Consider the theoretical first order nonlinear system which is given below Theoretical Model $$\dot{x}_m = -x_m - u_m x_m + u_m$$

$$y_m = x_m$$

Reference Model $$\dot{x}_d = -a_d x_d + b_d u_d$$

$$y_d = x_d$$

The control algorithm that has been proposed utilizes the control variable $u_m$ to create an additional state of the system. By applying the procedure of developing the control algorithm that has been discussed earlier the derivative of the state variable is therefore $\dot{u}_m = -\lambda(1-y_m)(\dot{y}_m + a_d y_m - b_d u_c)$. The modified controller for the theoretical model therefore becomes $$\dot{x}_m = -x_m - u_m x_m + u_m$$

$$\dot{u}_m = -\lambda(1-y_m)(\dot{y}_m + a_d y_m - b_d u_c)$$

$$y_m = x_m$$

Figure 12A:
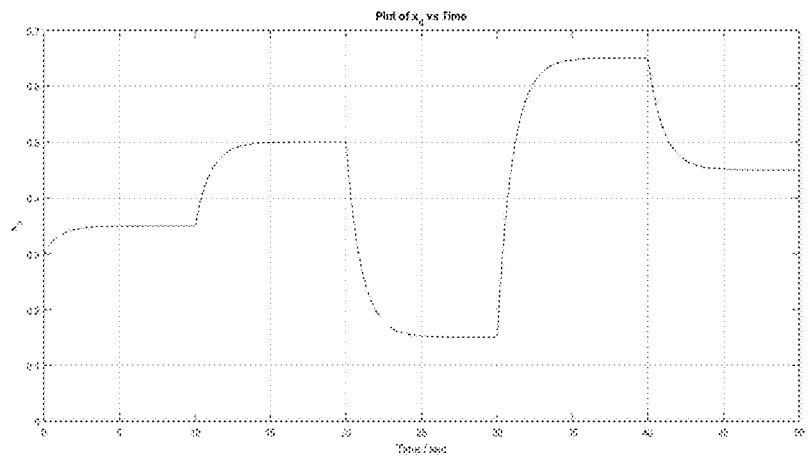
FIG. 12A is a graph illustrating a plot of x_d vs Time in accordance with at least one embodiment disclosed herein.
Figure 12B:
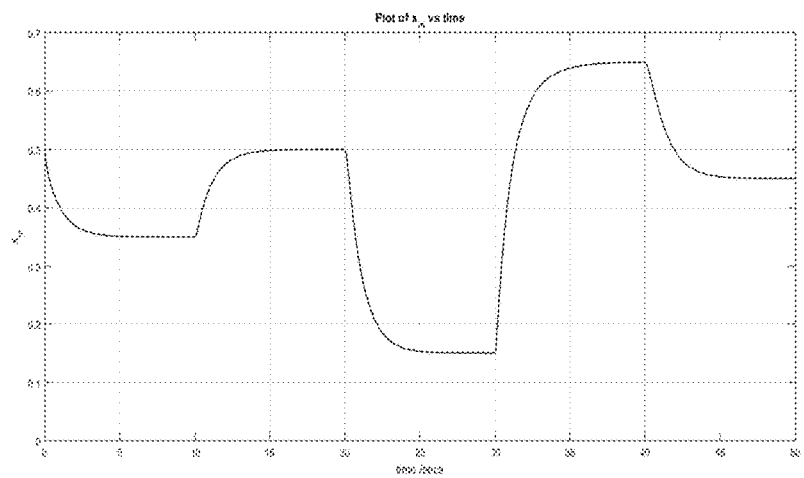
FIG. 12B is a graph illustrating a plot of x_m vs Time in accordance with at least one embodiment disclosed herein.
Figure 12C:
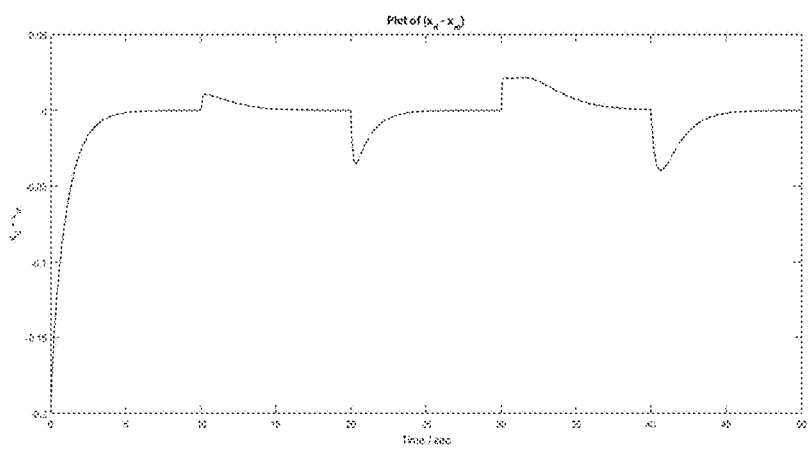
FIG. 12C is a graph illustrating a plot of (x_d−x_m) vs Time in accordance with at least one embodiment disclosed herein.

For simplicity the values of $a_d$ and $b_d$ are both set equal to 1. In this case $u_c = u_d$ FIG. 12A is a graph illustrating a plot of x_d vs Time in accordance with at least one embodiment disclosed herein.
FIG. 12B is a graph illustrating a plot of x_m vs Time in accordance with at least one embodiment disclosed herein.
FIG. 12C is a graph illustrating a plot of (x_d−x_m) vs Time in accordance with at least one embodiment disclosed herein.

7.2 Adaptive Reference Tracking Control

The objective of Reference Adaptive Control is to create a closed loop system for the plant or system to be controlled whose system out to a reference signal is exactly that of the reference signal. The adjustment algorithm that is used manipulates the control signal such that the resulting system output tracks the reference signal exactly.

Consider the theoretical first order nonlinear system which is given below

Theoretical Model $$\dot{x}_m = -x_m - u_m x_m + u_m$$

$$y_m = x_m$$

Reference Model $$\dot{x}_d = -a_d x_d + b_d u_d$$

$$y_d = x_d$$

Consider the reference model which has been described in the previous section. For the reference model to track a reference signal $y_{ref}$, the input $u_d$ for the reference model would therefore become $u_d = 1/b_d \ (a y_d - k_c (y_d - y_{ref}) + \dot{y}_{ref})$, where $y_{ref}$ and $\dot{y}_{ref}$ are the reference signal and the time derivative of the reference signal. Here $k_c$ is the gain that is used to indicate the rate at which the difference between the output and reference signal approaches zero.

However to achieve this, there is a simple modification of the model reference adaptive control algorithm to allow for the reference adaptive control design to be achieved. The procedure described in the previous paragraph can be substituted in for $u_c$ in the control design as follows $$\dot{u}_m = -\lambda(1-y_m)(\dot{y}_m + a_d y_m - b_d u_c)$$

$$\dot{u}_m = -\lambda(1-y_m)\left(\dot{y}_m + a_d y_m - b_d \frac{1}{b_d}(a y_d - k_c(y_m - y_{ref}) + \dot{y}_{ref})\right)$$

$$\dot{u}_m = -\lambda(1-y_m)(\dot{y}_m - \dot{y}_{ref} + k_c(y_m - y_{ref}))$$

$$\dot{u}_m = -\lambda(1-y_m)(\dot{e}_m + k e_m)$$

In the case of reference tracking adaptive control the input $$u_c = \frac{1}{b_d}(a y_m - k_c(y_m - y_{ref}) + \dot{y}_{ref})$$

Figure 13A:
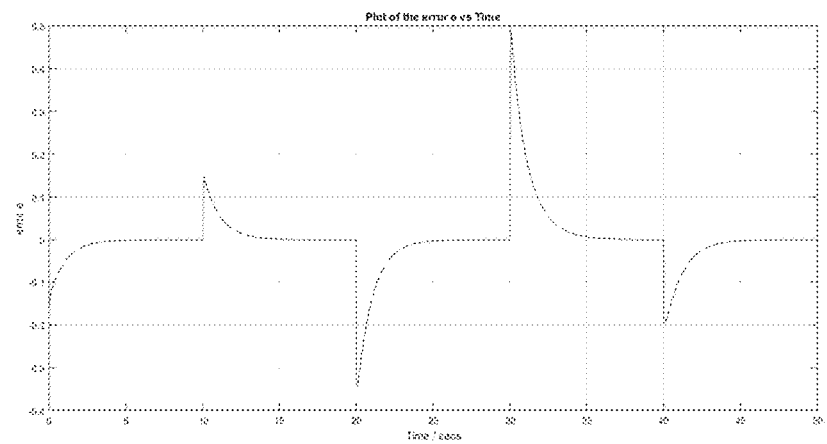
FIG. 13A is a graph illustrating a plot of error vs Time in accordance with at least one embodiment disclosed herein.
Figure 13B:
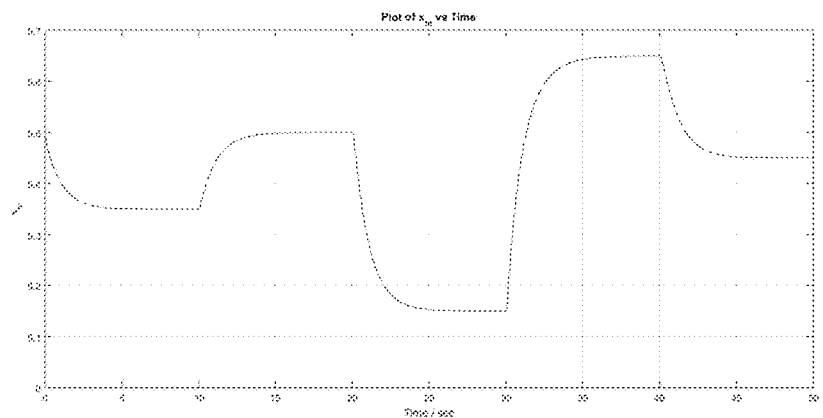
FIG. 13B is a graph illustrating a plot of x_m vs Time in accordance with at least one embodiment disclosed herein.

FIG. 13A is a graph illustrating a plot of error vs Time in accordance with at least one embodiment disclosed herein;
FIG. 13B is a graph illustrating a plot of x_m vs Time in accordance with at least one embodiment disclosed herein;

7.3 Model Reference Adaptive Control Vs Reference Tracking Adaptive Control

In comparing the two methods, it is observed that the reference tracking adaptive control is an extension of the model reference adaptive control. The change between the two algorithm arises with $u_c$. Note in the body of this document this variable is equivalent to the control input v. Also note that the new control input is required because the control variable due to the application of the algorithm has become a system state.

|   | Model Reference Adaptive Control | Reference Tracking Adaptive Control |
|---|---|---|
| Control Input $u_c$ | The new control input is equal to the input of the reference model | The new control input is used to track a reference signal. |
| Output Response $y_m$ | The output response is equivalent to the reference model. | The output response is equivalent to the reference signal. |

System Parameter Selection

The parameter selection is performed mainly with the knowledge of the system or plant outputs and its derivatives. Recall from Section 5.2 where the general first order non-linear system control system has been discussed. The values of $\lambda$, a and b where to be designed using the inequalities given below.

$$\dot{u}_{min} < -\lambda \frac{\partial h(x)}{\partial x} \frac{\partial (g(x,u))}{\partial u}(\dot{y} + ay - bv) < \dot{u}_{max}$$

$$\dot{y}_{min} < (-ay + bv) < \dot{y}_{max}$$

7.3.1 Lambda Selection $$\dot{u}_{min} < -\lambda \frac{\partial h(x)}{\partial x} \frac{\partial (g(x,u))}{\partial u}(\dot{y} + ay - bv) < \dot{u}_{max}$$

1) The maximum magnitudes of the negative and positive time derivative of the control variable u are noted. The smaller of the two values should be recorded. This value is entered as $c_u$
2) The maximum magnitude of the negative and positive $$\left(\frac{\partial h(x)}{\partial x} \frac{\partial (g(x,u))}{\partial u}\right)$$

is noted. The larger of the two values is recorded as $c_b$.
3) The maximum magnitudes of the negative and positive time derivative of the process variable y are noted. The larger of the two values is recorded. This value is entered as $c_y$.
4) The value of lambda is now calculated below $$c_u = \lambda c_b(2c_y)$$

$$\lambda = \frac{c_u}{c_b(2c_y)}$$

7.3.2 Coefficient Selection (a,b)

$$\dot{y}_{min} < (-ay+bv) < \dot{y}_{max}$$

1) The maximum magnitudes of the negative and positive time derivative of the process variable y are noted. The larger of the two values is recorded. This value is entered as $c_y$.
2) The maximum magnitudes of the negative and positive of the process variable y are noted. The larger of the two values should be recorded. This value is entered as $c_x$. In the event that the objective function is a n-ordered system, the maximum values of the all derivatives are recorded.
3) The maximum magnitudes of the negative and positive of the new control input $v/u_c$ are noted. The larger of the two values should be recorded. This value is entered as $c_x$
4) The equation for the calculation now becomes.

$$c_y > ac_x + bc_v$$

Recall that for a stable system, a must be positive. The constant b can be either negative or positive based on the sign of the control input $v/c_v$.

5) The calculation depends on the range of the process variable and the scaling. For instance, in temperature control, the range may be 0-300 degree Celsius and this is mapped to a 0-100% input. However it is advised that the scaling is performed before the values are sent to the control algorithm such that $c_x=c_v$. In this case the magnitude of a=b and therefore $$c_y > 2ac_x$$

$$\frac{c_y}{2c_x} > a$$

6) In the event that the system has an order greater than 1, the equation becomes the inequality defined below where $$\frac{d^i y}{dt^i}$$

is the highest differential.

$$\left|\frac{d^i y}{dt^i}\right| > a_i \left|\frac{d^{i-1} y}{dt^{i-1}}\right| + a_{i-1}\left|\frac{d^{i-2} y}{dt^{i-2}}\right| + \ldots + a_1|y| + b|v|$$

7.3.3 Objective Function Selection

7.3.3.1 Single Objective Function Selection

The objective function is developed by following the steps which have been provided below. To provide an example that can assist in illustrating the design steps for the objective function. The model for the bioreactor is used.

$$\dot{x}_1 = \frac{x_1 x_2}{x_2 + 1} - u x_1$$

$$\dot{x}_2 = -\frac{x_1 x_2}{x_2 + 1} - u x_2 + s_{in} u$$

$$y = x_1$$

1) A model that represents the behavior of the system needs to be obtained. The system will have an order of n.
   a. From the model given above, there are two states and therefore the order of the model is n=2
2) The output variable which is to be controlled has to be identified.
   a. The output variable is $y=x_1$ 3) The control variable which will be used to manipulate the output variable also needs to be identified.
   a. The control variable is u
4) The time differential of the output is performed repeatedly until the control variable has been obtained. The number of repeated differentiations is noted by the number i.
   Note i≤n.

$$\frac{dy}{dt} = \dot{y} = \dot{x}_1 = \frac{x_1 x_2}{x_2 + 1} - u x_1$$

5) If the system has other state equations where the control variable is present, the system can be differentiated until all the equations where the control variable appears is translated into the controllable canonical form. The system would have been differentiated j times where i<j≤n. the highest time derivative of the control input will be used in the time derivative. Note: This step is optional $$\frac{d^2 y}{dt^2} = \ddot{y} = \ddot{x}_1 = \frac{(x_1 \dot{x}_2 + \dot{x}_1 x_2)(x_2 + 1) - x_1 x_2 \dot{x}_2}{(x_2 + 1)^2} - \dot{u} x_1 - u \dot{x}_1$$

Note: As the equation above includes a derivative of the input u, the derivative of the input is used to minimize the objective function. In general the highest derivative of u will be used to minimize the objective function.

6) If it is desired that the behavior of the entire system is to be controlled then the output is differentiated n times to transform the entire dynamics of the system to the controllable canonical form. The highest time derivative of the control input will be used in the time derivative. Note: This step is optional $$\frac{d^2 y}{dt^2} = \ddot{y} = \ddot{x}_1 = \frac{(x_1 \dot{x}_2 + \dot{x}_1 x_2)(x_2 + 1) - x_1 x_2 \dot{x}_2}{(x_2 + 1)^2} - \dot{u} x_1 - u \dot{x}_1$$

Note: As the equation above includes a derivative of the input u, the derivative of the input is used to minimize the objective function. In general the highest derivative of u will be used to minimize the objective function.

7) Given the steps above have been performed correctly, the objective function can now be defined.
   a. For the case where only step 4 has been performed, the general form of the objective function is given as $$J = \frac{1}{2}\left(\frac{d^i y}{dt^i} + a_i \frac{d^{i-1} y}{dt^{i-1}} + a_{i-1} \frac{d^{i-2} y}{dt^{i-2}} + \ldots + a_1 y - bv\right)^2$$

For the bioreactor system the objective function is $$J = \frac{1}{2}\left(\frac{d^1 y}{dt^1} + a_1 y - bv\right)^2$$

b. For the case where only step 5 has been performed, the general form of the objective function is given as $$J = \frac{1}{2}\left(\frac{d^j y}{dt^j} + a_j \frac{d^{j-1} y}{dt^{j-1}} + a_{j-1} \frac{d^{j-2} y}{dt^{j-2}} + \ldots + a_1 y - bv\right)^2$$

For the bioreactor system the objective function is $$J = \frac{1}{2}\left(\frac{d^2 y}{dt^2} + a_2 \frac{d^1 y}{dt^1} + a_1 y - bv\right)^2$$

c. For the case where only step 6 has been performed, the general form of the objective function is given as $$J = \frac{1}{2}\left(\frac{d^n y}{dt^n} + a_n \frac{d^{n-1} y}{dt^{n-1}} + a_{n-1} \frac{d^{n-2} y}{dt^{n-2}} + \ldots + a_1 y - bv\right)^2$$

For the bioreactor system the objective function is $$J = \frac{1}{2}\left(\frac{d^2 y}{dt^2} + a_2 \frac{d^1 y}{dt^1} + a_1 y - bv\right)^2$$

7.3.3.2 Multiple Objective Function Selection & Multivariable Control

For this case, the creation of multiple objective functions is an extension of the previous objective function selection.

$$\dot{x}_1 = \frac{x_1 x_2}{x_2 + 1} - u x_1$$

$$\dot{x}_2 = -\frac{x_1 x_2}{x_2 + 1} - u x_2 + s_{in} u$$

$$y_1 = x_1$$

$$y_2 = x_2$$

1) A model that represents the behavior of the system needs to be obtained. The system will have an order of n.
   a. From the model given above, there are two states and therefore the order of the model is n=2
2) The output variables which are to be controlled has to be identified.
   a. The output variable are $y_1 = x_1$ and $y_2 = x_2$. In this case both states are outputs of the system.
3) The control variable which will be used to manipulate the output variable also needs to be identified.
   a. The control variable used to control $x_1$ is u.
   b. The control variable used to control $x_2$ is s_in.
4) The steps remaining steps in 7.3.3.1 are then performed to obtain the respective steps for objective functions for the outputs $J_{x_1}$ and $J_{x_2}$. Steps 5 and 6 are not performed. For a system with q distinct outputs which need to be controlled, there should be q distinct inputs. The steps in 7.3.3.1 are performed to yield q distinct objective functions and therefore q distinct control algorithms.

$$J_{x_1} = \frac{1}{2}\left(\frac{d^1 y_1}{dt^1} + a_1 y_1 - b_1 v_1\right)^2$$

-continued $$J_{x_2} = \frac{1}{2}\left(\frac{d^1 y_2}{dt^1} + a_2 y_2 - b_2 v_2\right)^2$$

These functions are minimized with respect to their respective control variable.

$$\dot{u} = -\lambda_1 \frac{\partial J_{x_1}}{\partial u}$$

$$\dot{s}_{in} = -\lambda_2 \frac{\partial J_{x_2}}{\partial s_{in}}$$

5) In the event that the objective function contains a control variable which are both of the highest order differential. The sum of the individual objective functions can be used to create an objective function for both variables.

$$V = J_{x_1} + J_{x_2}$$

8 Appendix B
8.1 Poles/Eigenvalues

In classical control theory the poles of system signify the response of the system and more importantly, the stability of the system. Using state space to represent the dynamics of a system, the poles are often referred to as eigenvalues. For a system to be stable all the eigenvalues of a system must be negative. The eigenvalues are calculated using the system state matrix A. For nonlinear systems the state matrix $\tilde{A}$ is calculated by linearizing the system as shown in $$\tilde{A} = \begin{bmatrix} \frac{\partial f_1(x,u)}{\partial x_1} & \cdots & \frac{\partial f_1(x,u)}{\partial x_n} \\ \vdots & \ddots & \vdots \\ \frac{\partial f_n(x,u)}{\partial x_1} & \cdots & \frac{\partial f_n(x,u)}{\partial x_n} \end{bmatrix}.$$

Where $f_i(x, u)$ is the $i^{th}$ state equation of the system. Since the parameter $\lambda$ is used to represent the adaptive gain, the parameter a will therefore be used to represent the eigenvalue. The eigenvalue is calculated using the following matrix equation. The matrix I is the identity matrix which matches the order or the number of state equations.

$$\sigma I - \tilde{A}$$

The determinant of the resulting matrix is calculated and this is set equal to zero. Therefore solving for the values of $\sigma$, the values of the systems eigenvalues are therefore determined.

$$det(\sigma I - \tilde{A}) = 0$$

To illustrate the calculation of eigenvalues, the surge drum will be used as an example. The eigenvalues of the system will be shown that for the operating region, the eigenvalue of the system output will be approximately equal to that of the system specified.

$$\dot{P} = \frac{RT}{V} q_i - \frac{RT}{V} \beta \sqrt{P - P_h}$$

$$\dot{q}_i = -\lambda \frac{RT}{V}(\dot{P} + aP - bv)$$

$$y = P$$

Controllable Canonical Form $$z_1 = y = P$$

$$z_2 = \dot{y} = \dot{P}$$

Therefore $$\dot{z}_1 = z_2$$

$$\dot{z}_2 = -\lambda a\left(\frac{RT}{V}\right)^2 z_1 - \left(\lambda\left(\frac{RT}{V}\right)^2 + \frac{1}{2}\left(\frac{\alpha\beta}{(z_1 - P_h)^{\frac{1}{2}}}\right)\right)z_2 + \lambda b\left(\frac{RT}{V}\right)^2 v$$

Performing the linearization of the state equations the linearized state matrix is therefore obtained.

$$\tilde{A} = \begin{vmatrix} 0 & 1 \\ -\lambda a\left(\frac{RT}{V}\right)^2 + \frac{1}{4}\left(\frac{\alpha\beta z_2}{(z_1 - P_h)^{\frac{3}{2}}}\right) & -\lambda\left(\frac{RT}{V}\right)^2 - \frac{1}{2}\left(\frac{\alpha\beta}{(z_1 - P_h)^{\frac{1}{2}}}\right) \end{vmatrix}$$

Substituting $$f_1(z_1, z_2) = -\lambda a\left(\frac{RT}{V}\right)^2 + \frac{1}{4}\left(\frac{\alpha\beta z_2}{(z_1 - P_h)^{\frac{3}{2}}}\right) \text{ and}$$

$$f_2(z_1, z_2) = -\lambda\left(\frac{RT}{V}\right)^2 - \frac{1}{2}\left(\frac{\alpha\beta}{(z_1 - P_h)^{\frac{1}{2}}}\right)$$

the linearized state matrix $\tilde{A}$ therefore becomes $$\tilde{A} = \begin{bmatrix} 0 & 1 \\ f_1(z_1, z_2) & f_2(z_1, z_2) \end{bmatrix}$$

Performing the steps to determine the eigenvalues $$\sigma I - \tilde{A} = \begin{bmatrix} \sigma & 0 \\ 0 & \sigma \end{bmatrix} - \begin{bmatrix} 0 & 1 \\ f_1(z_1, z_2) & f_2(z_1, z_2) \end{bmatrix}$$

$$\sigma I - \tilde{A} = \begin{bmatrix} \sigma & -1 \\ -f_1(z_1, z_2) & \sigma - f_2(z_1, z_2) \end{bmatrix}$$

The determinant of the above matrix calculation is therefore $$det(\sigma I - \tilde{A}) = \sigma^2 - f_2(z_1, z_2)\sigma - f_1(z_1, z_2)$$

By setting the determinant $det(\sigma I - \tilde{A}) = 0$, the values of $\sigma$ can therefore be obtained.

$$\sigma = \frac{-(-f_2(z_1, z_2)) \pm ((-f_2(z_1, z_2))^2 - 4(-f_1(z_1, z_2)))^{\frac{1}{2}}}{2}$$

$$\sigma = \frac{(f_2(z_1, z_2)) \pm ((f_2(z_1, z_2))^2 + 4(f_1(z_1, z_2)))^{\frac{1}{2}}}{2}$$

As the system is a second order system where n=2

$$\sigma_1 = \frac{(f_2(z_1, z_2)) + ((f_2(z_1, z_2))^2 + 4(f_1(z_1, z_2)))^{\frac{1}{2}}}{2}$$

$$\sigma_2 = \frac{(f_2(z_1, z_2)) - ((f_2(z_1, z_2))^2 + 4(f_1(z_1, z_2)))^{\frac{1}{2}}}{2}$$

Below are the plots for the eigenvalues for the operating range of 5-40 atm of the surge drum.

Figure 14A:
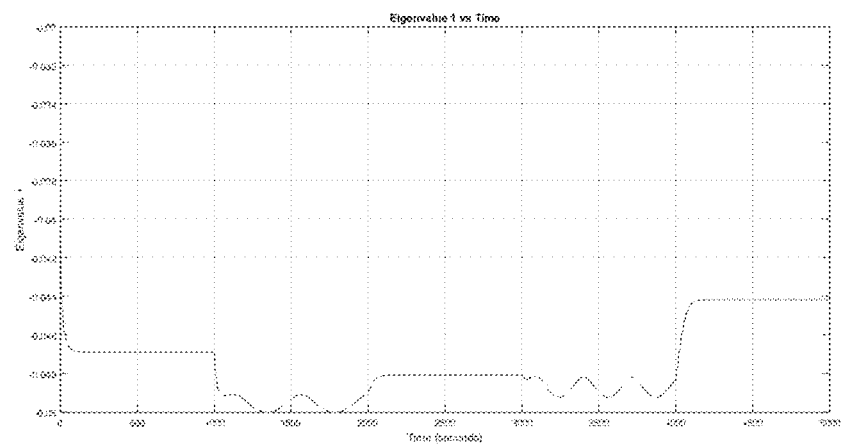
FIG. 14A is a graph illustrating a plot of Eigenvalue 1 vs Time for the Gas Surge Drum in accordance with at least one embodiment disclosed herein.
Figure 14B:
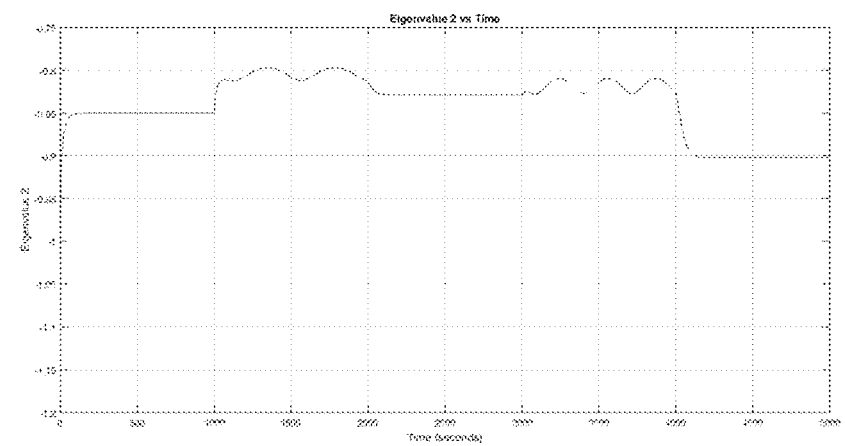
FIG. 14B is a graph illustrating a plot of Eigenvalue 2 vs Time for the Gas Surge Drum in accordance with at least one embodiment disclosed herein.

FIG. 14A is a graph illustrating a plot of Eigenvalue 1 vs Time for the Gas Surge Drum in accordance with at least one embodiment disclosed herein FIG. 14B is a graph illustrating a plot of Eigenvalue 2 vs Time for the Gas Surge Drum in accordance with at least one embodiment disclosed herein.

Comments:

Note that the first plot which has been shown indicates that one of the estimated eigenvalue is approximately at 0.05 for the operating range of the system output P. The second plot shows the eigenvalue for the control input $q_i$. This presents further evidence that the control designs is capable of imposing a response on the system.

The subject matter described above is provided by way of illustration only and should not be construed as limiting. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various modifications and changes can be made to the subject matter described herein without following the example embodiments and applications illustrated and described, and without departing from the true spirit and scope of the present invention, as set forth in each and any of the following claims.

What is claimed:

1. A method for configuring a controller of a non-linear process system for producing a product within a process vessel, comprising:
    providing a state-space model of the system, wherein the state space model comprises one or more state-space equations representing a relationship between at least one system variable x representing a temperature inside the vessel, and at least one system output y representing a temperature inside the vessel and is a function of at least one control variable u, wherein u relates to a flow of steam for heating the vessel and is an input to the system and wherein a quality measure of the product is a function of y;
    transforming, with one or more processors configured by executing instructions in the form of code therein, the state-space model into one or more controllable canonical equations, wherein at least one of the one or more controllable canonical equations includes the control variable u;
    generating, with the one or more processors, an objective function J, wherein generating the objective function includes:
        selecting, with the one or more processors, the objective function J from among a plurality of objective functions stored in a non-transitory computer readable storage medium, wherein J is selected based on at least an order of the state space model, and wherein J is a function of the system output y, the derivatives of y and a control input v, a gain λ and system constants a and b, wherein control input v defines one or more operational set-points of the system including a target value of the system variable y, and
        inputting, with one or more processors, the one or more controllable canonical equations into the selected objective function;
    minimizing, with one or more processors, the objective function with respect to the control variable u;
    selecting, with one or more processors, parameters of the control system including the gain λ and a and b according to constraints of the non-linear process system;
    programmatically configuring the controller to implement a control algorithm defined by the minimized objective function in view of the selected parameters;
    monitoring, with the one or more processors during operation of the system, a measured value of the temperature within the vessel, y, wherein the temperature varies during operation as a function of changing operating conditions and wherein the temperature is measured using a temperature sensor provided at the vessel;
    automatically modifying, with the one more processors, the value of the control variable u according to the control algorithm and based on the measure temperature value, y, wherein modifying the control variable is performed by adjusting a position of a valve modulating the flow of the steam used to heat the vessel; and
    iteratively performing the monitoring and modifying step using the one or more processors so as to maintain the temperature y in suitable range of the quality of the product produced within the vessel.

2. The method of claim 1, wherein the process vessel is selected from the group consisting of:
    a reactor, and a distillation column.

3. The method of claim 1, wherein transforming the state-space model into one or more controllable canonical equations further comprises:
    if the control variable u is not represented in at least one of the one or more state-space equations,
        differentiating the one or more state-space equations one or more times until the control variable u is represented in at least one of the differentiated state-space equations.

4. The method of claim 3, wherein minimizing the objective function comprises:
    if the objective function does not include a differential of u,
        computing a derivative of the objective function with respect to u, otherwise, if the objective function includes one or more differentials of u, computing a derivative of the objective function with respect to a highest differential of u among the one or more differentials of u; and selecting a negative gradient of the derivative of the objective function.

5. The method of claim 1, wherein the objective function J is generated according to a reference model that defines a target response of the output y of the regulated non-linear process system in relation to the control input v.

6. The method of claim 3, wherein the objective function J is generally defined by the following equation:

$$J = \frac{1}{2}\left(\frac{d^i y}{dt^i} + a_i \frac{d^{i-1} y}{dt^{i-1}} + a_{i-1} \frac{d^{i-2} y}{dt^{i-2}} + \ldots + a_1 y - bv\right)^2$$

wherein i is the number of times that the one or more state-space equations was differentiated until the control variable u was represented in at least one of the differentiated state-space equations.

7. The method of claim 1, wherein the negative gradient of the objective function is represented by the following equation:

$$\dot{u} = -\lambda \frac{\partial J}{\partial u};$$

in the case where one or more derivatives of u are present in the objective function, wherein the highest derivative is noted by the number "m," then $$\frac{d^{m+1} u}{dt^{m+1}} = -\lambda \frac{\partial J}{\partial \left(\frac{d^m u}{dt^m}\right)}; \text{ and}$$

for the case $\dot{u} = -\lambda \frac{\partial J}{\partial u}, m = 0$.

8. The method of claim 6, wherein selecting parameters of the control system including λ and a and b according to constraints of the non-linear process system further comprises:

defining λ to satisfy the following conditions:

$$(\dot{y})^2_{min}\left(\frac{\partial h(x)}{\partial x} \frac{\partial (g(x, u))}{\partial u}\right)^2_{min} \neq 0 \text{ and}$$

$$(\dot{y})^2_{max}\left(\frac{\partial h(x)}{\partial x} \frac{\partial (g(x, u))}{\partial u}\right)^2_{max} \neq 0$$

$$\dot{u}_{min} < -\lambda \frac{\partial h(x)}{\partial x} \frac{\partial (g(x, u))}{\partial u} (\dot{y} + ay - bv) < \dot{u}_{max}$$

defining the values of a and b to satisfy the following equation:

$\dot{y}_{min} < (-ay+bv) < \dot{y}_{max}$ wherein $\dot{y}_{min}$ and $\dot{y}_{max}$ are pre-defined constraints and represent bounded values of the system output response and wherein $\dot{u}_{min}$ and $\dot{u}_{max}$ are pre-defined constraints and represent bounded values of the response time of the control variable u; and wherein the parameters are defined such that the control variable u has a response time that is capable of minimizing the objective function J.

9. The method of claim 1, wherein the state variable $x_i$ is bounded such that $\|x_i\| < c_{1_i}$ and $\|\dot{x}_i\| < c_{2_i}$ and wherein $c_{1_i}$ and $c_{2_i}$ are both positive numbers corresponding to the $i^{th}$ state, whereby, for the control input variable u that is bounded, the output y will be bounded by values $\dot{y}_{min}$ and $\dot{y}_{max}$.

10. The method of claim 1, wherein providing the state-space model comprises:

monitoring, with the one or more processors during operation of the non-linear process system, the at least one system input x, and the at least one system output y;

mapping the system relationship between the at least one system input x, and the at least one system output y as a function of at least one control variable u;

generating the state-space model as a function of the mapped system relationship.

11. A method for regulating a non-linear process system for producing a product within a process vessel, comprising:

providing, to a computer-based controller, a state-space model of the non-linear process system ("the system"), wherein the state-space model represents a relationship between at least one system variable including temperature or pressure and at least one system output including temperature or pressure as a function of at least one system control variable including a gas flow rate, wherein the at least one system variable is a value for an internal pressure within the vessel and wherein the at least one system output is the value for an internal pressure within the vessel, and wherein the at least one system control variable relates to a flow rate into or out of the vessel and is an input to the process system and is controlled by the controller, and wherein the at least one system output relates to a quality measure of the product produced by the system, and providing, to the controller, a reference model, wherein the reference model defines a target response of the at least one system output in relation to at least one controller input to produce a product having a prescribed quality measure, wherein the controller input defines one or more operational set-points of the system including a target value of the internal pressure within the vessel;

providing, to the controller, one or more objective functions and a set of operational constraints relating to the non-linear process system;

generating, with the controller, an adaptive non-linear control model according to the state-space model, the reference model and one or more objective functions and the set of operational constraints;

periodically monitoring, by the controller using one or more pressure sensors coupled to the system during operation of the process system, process information including measured values of the at least one system variable and the at least one system output including the internal pressure; and dynamically controlling, with the processor executing the adaptive non-linear control model based on the received process information, a value of the at least one system control variable to manipulate the least one system output in accordance with the target response thereby maintaining the non-linear process system in stable state and the internal vessel pressure within a prescribed operating range suitable for producing a product having the prescribed quality measure, wherein controlling the value of the at least one system control variable include adjusting a position of one or more valves modulating an air flow of fluid to the vessel or an outflow of fluid from the vessel.

12. The method of claim 11, wherein generating the adaptive non-linear control model comprises:
transforming the state-space model into one or more controllable canonical equations, wherein at least one of the one or more controllable canonical equations includes the at least one control variable;
generating, with the one or more processors, the one or more objective functions based on an order of the state-space model and using the reference model;
inputting, with one or more processors, the one or more controllable canonical equations into the one or more objective functions;
minimizing, with one or more processors, the one or more objective functions with respect to the at least one control variable; and
defining, with one or more processors, parameters of the adaptive control model according to the constraints of the non-linear process system and the controller.

13. The method of claim 12, wherein minimizing the one or more objective functions comprises:
if the objective function does not include there a differential of the at least one control input,
computing a derivative of the objective function with respect to the at least one control input,
otherwise, if the objective function includes one or more differentials of the at least one control input,
computing a derivative of the objective function with respect to a highest differential of the at least one control input among the one or more differentials of the at least one control input; and
selecting a negative gradient of the derivative of the objective function.

14. The method of claim 12, wherein the constraints include $\dot{y}_{min}$ and $\dot{y}_{max}$ which are pre-defined constraints and represent bounded values of the system output response, and $\dot{u}_{min}$ and $\dot{u}_{max}$, which are pre-defined constraints and represent bounded values of the response time of the at least one control variable; and
wherein the parameters are defined such that the at least one control variable has a response time that is capable of minimizing the one or more objective functions.

15. The method of claim 11, wherein the process vessel is selected from the group consisting of: a surge drum, and a distillation column.

* * * * *